United States Patent
Oh

(10) Patent No.: US 10,319,334 B2
(45) Date of Patent: Jun. 11, 2019

(54) IMAGE PROCESSING APPARATUS AND CONTROL METHOD THEREOF

(71) Applicant: SAMSUNG ELECTRONICS CO., LTD., Suwon-si, Gyeonggi-do (KR)

(72) Inventor: Sung-bo Oh, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/246,897

(22) Filed: Aug. 25, 2016

(65) Prior Publication Data

US 2017/0069289 A1   Mar. 9, 2017

(30) Foreign Application Priority Data

Sep. 3, 2015  (KR) .................. 10-2015-0125064

(51) Int. Cl.
*G09G 5/00* (2006.01)
*H04N 5/44* (2011.01)
*H04N 21/40* (2011.01)
*H04N 5/38* (2006.01)

(52) U.S. Cl.
CPC .............. *G09G 5/006* (2013.01); *H04N 5/44* (2013.01); *H04N 21/40* (2013.01); *G09G 2320/0693* (2013.01); *G09G 2350/00* (2013.01); *H04N 5/38* (2013.01)

(58) Field of Classification Search
CPC .............. G09G 5/006; G09G 2350/00; G09G 2320/0693; H04N 5/44; H04N 21/40; H04N 5/38
See application file for complete search history.

(56) References Cited

U.S. PATENT DOCUMENTS

| | | | | |
|---|---|---|---|---|
| 6,772,392 B1* | 8/2004 | Kawada | ................... | H04N 5/38 348/192 |
| 2007/0257923 A1* | 11/2007 | Whitby-Strevens | ... | G09G 5/006 345/520 |
| 2007/0257927 A1* | 11/2007 | Sakanishi | .............. | G09G 5/005 345/581 |
| 2008/0246752 A1* | 10/2008 | Lee | .......................... | G09G 3/20 345/213 |
| 2009/0041101 A1* | 2/2009 | Nagatani | .......... | G01R 31/31709 375/221 |
| 2009/0096921 A1* | 4/2009 | Katayama | .......... | H04N 5/44591 348/469 |
| 2012/0092694 A1* | 4/2012 | Tsubota | ............. | G06K 15/1821 358/1.14 |
| 2014/0016032 A1* | 1/2014 | Chou | ................... | H04N 7/0125 348/441 |

FOREIGN PATENT DOCUMENTS

KR   10-2010-0123138    11/2010

* cited by examiner

*Primary Examiner* — William A Beutel
(74) *Attorney, Agent, or Firm* — Nixon & Vanderhye P.C.

(57) ABSTRACT

A image processing apparatus is provided, the image processing apparatus including: a transmitting terminal; a receiving terminal configured to receive an image signal from the transmitting terminal; a sensor configured to sense whether an image format error occurs in the image signal received in the receiving terminal; and at least one processor configured to control the transmitting terminal to recover the image signal transmitted from the transmitting terminal from the image format error in response to the image format error sensed by the sensor, and to control the receiving terminal to receive the recovered image signal.

16 Claims, 24 Drawing Sheets

FIG. 8

| Resolution | Refresh rate (Pixel clock) | color depth | No. of data lanes |
|---|---|---|---|
| HD<br>ex. 1280 x 720p | 60Hz(74.25MHz) | 18/24/30/36 bit | 1 |
| | 120Hz(148.5MHz) | 18/24/30/36 bit | 2 |
| | 240Hz(297MHz) | 18/24/30/36 bit | 4 |
| Full HD<br>ex. 1920 x 1080p | 60Hz(148.5MHz) | 18/24/30/36 bit | 2 |
| | 120Hz(297MHz) | 18/24/30/36 bit | 4 |
| | 240Hz(594MHz) | 18/24/30/36 bit | 8 |
| | 480Hz(1188MHz) | 18/24/30/36 bit | 16 |
| Cinema Full HD<br>ex. 2560 x 1080p | 60Hz(185MHz) | 18/24/30 bit | 2 |
| | 120Hz(370MHz) | 18/24/30 bit | 4 |
| | 240Hz(740MHz) | 18/24/30 bit | 8 |
| 4K x 2K<br>ex. 3840 x 2160p | 60Hz(594MHz) | 18/24/30/36 bit | 8 |
| | 120Hz(1188MHz) | 18/24/30/36 bit | 16 |
| | 240Hz(2376MHz) | 18/24/30/36 bit | 32 |

| RESOLUTION | H-sync | V-sync | DE |
|---|---|---|---|
| m1 x n1 | k1 | k2 | k3 |
| m2 x n2 | k4 | k5 | k6 |
| ⋮ | ⋮ | ⋮ | ⋮ |

| ORDER OF PRIORITY | RECOVERING METHODS |
|---|---|
| 1 | RESETTING OF TRANSMITTER |
| 2 | RESETTING OF IMAGE SIGNAL GENERATOR |
| 3 | RESUMING AFTER INPUT OF IMAGE SIGNAL |
| 4 | RESETTING OF CLOCK |
| 5 | RESETTING OF BOARD |

IMAGE PROCESSING APPARATUS AND CONTROL METHOD THEREOF

CROSS-REFERENCE TO RELATED APPLICATION

This application is based on and claims priority under 35 U.S.C. § 119 to Korean Patent Application No. 10-2015-0125064 filed on Sep. 3, 2015 in the Korean Intellectual Property Office, the disclosure of which is incorporated by reference herein in its entirety.

BACKGROUND

Field

Apparatuses and methods of the disclosure relate generally to an image processing apparatus capable of processing image data to be displayed as an image on its own display panel or an external display apparatus and a control method thereof, and for example to an image processing apparatus having a structure for detecting whether an image format error of image data occurs in an interface for transmitting the image data and recovering the image data from the error in real time and a control method thereof.

Description of Related Art

To compute and process predetermined information in accordance with certain processes, an electronic apparatus basically includes a central processing unit (CPU), a chipset, a memory, and the like electronic components for computation. Such an electronic apparatus may be classified variously in accordance with what information will be processed therein. For example, the electronic apparatus is classified into an information processing apparatus such as a personal computer, a server or the like for processing general information, and an image processing apparatus for processing image information.

The image processing apparatus processes an image signal or image data received from the exterior in accordance with various image processing processes. The image processing apparatus may display an image based on the processed image data on its own display panel, or output the processed image data to another display apparatus provided with a panel so that on the corresponding display apparatus can display an image based on the processed image signal. That is, the image processing apparatus may include the panel capable of displaying an image or include no panel as long as it can process the image data. For example, the former may include a display apparatus such as a television (TV), a portable multimedia player (PMP), a tablet personal computer, a mobile phone, etc., and the latter may include a set-top box, a video player, etc.

The image data is transmitted from a transmitter to a receiver through an interface of preset standards. The transmitter and the receiver may be respectively provided as independent apparatuses or boards. As an example of transmitting the image data between the apparatuses, the image processing apparatus may output the image data to the display apparatus. As an example of transmitting the image data between the boards, the image processing board outputs the image data to a timing controller board. As resolution of image data has become higher, the amount of image data to be transmitted per unit clock increases. Accordingly, there have been proposed various transmission interface protocols in order to satisfy such requirements.

In a conventional case where image data is transmitted from the transmitter to the receiver through a preset interface, the image data has been directly received in the receiver without any separate checking process. By the way, a signal generated in the transmitter may fail to meet standards of image formats while the transmitter generates the signal to be transmitted, or a signal may be damaged while the transmitter is transmitting image data and thus transmitted to the receiver as it does not comply with the standards of the image format. Like this, if a signal that fails to meet the standards of image formats is received in the receiver, an image is abnormally displayed or not displayed at all.

Accordingly, a structure or method is required for detecting such an image format error of image data in real time and recovering the image data when image data is transmitted from the transmitter to the receiver.

SUMMARY

In accordance with an example aspect of the disclosure, an image processing apparatus is provided, the image processing apparatus including: a transmitting terminal; a receiving terminal configured to receive an image signal from the transmitting terminal; a sensor configured to sense whether an image format error occurs in the image signal received in the receiving terminal; and at least one processor configured to control the transmitting terminal to recover the image signal transmitted from the transmitting terminal from the image format error in response to the image format error sensed by the sensor, and to control the receiving terminal to receive the recovered image signal. Thus, the image format error occurring in the receiving terminal is corrected in real time, thereby guaranteeing the quality of the image.

The image signal may be transmitted through a plurality of lanes between the transmitting terminal and the receiving terminal, and the sensor may sense the image format error based on a first error determination signal transmitted through a first lane among the plurality of lanes and a second error determination signal generated by copying the first error determination signal and transmitted through a second lane different from the first lane.

The sensor may recover the image signal by synthesizing a third error determination signal, different from the first error determination signal and transmitted through a third lane different from the first and second lanes, with the first and second error determination signals, and may sense the image format error by determining whether the image format of the recovered image signal includes a preset standard.

The first error determination signal, the second error determination signal and the third error determination signal may be obtained by dividing the image signal into signals respectively corresponding to the plurality of lanes. Thus, it is possible to more accurately detect whether there is an image format error in the image signal.

The at least one processor may apply noise to the transmitting terminal, and the sensor may sense the image format error of the image signal received in the receiving terminal under a condition that the noise is applied to the transmitting terminal. Thus, it is possible to enhance the quality of the image signal from the transmitting terminal so the image signal to be transmitted can be resistant to noise and improved in reliability.

The transmitting terminal may include: a transmitter configured to convert the image signal to be transmittable to the receiving terminal in accordance with a preset transmission interface protocol; and an image signal generator configured to generate and provide the image signal to the transmitter, and the at least one processor is configured to recover the image signal from the image format error by resetting at least one of the transmitter and the image signal generator.

The preset transmission interface protocol may include V-by-One standards.

The at least one processor may recover the image signal from the image format error by resetting the whole transmitting terminal. Thus, it is possible to recover the image format of the image signal from the image format error.

The at least one processor may activate the sensor to sense the image format error in response to a preset event, and may determine that the preset event occurs if the image signal received in the receiving terminal is changed in resolution. Thus, it is possible to check the image format only if the image format error is expected in the image signal, without periodically detecting the image format error.

The transmitting terminal and the receiving terminal may be connected to each other so that the image signal can be transmitted through a transmission interface of, for example, V-by-One standards.

According to another example aspect of the disclosure, a method of controlling an image processing apparatus is also provided, the method including: receiving an image signal from a transmitting terminal in a receiving terminal; sensing whether an image format error occurs in the image signal received in the receiving terminal; controlling the transmitting terminal to recover the image signal transmitted from the transmitting terminal from the image format error in response to the sensed image format error; and receiving the recovered image signal in the receiving terminal. Thus, the image format error occurring in the receiving terminal is corrected in real time, thereby guaranteeing the quality of the image.

The image signal may be transmitted through a plurality of lanes between the transmitting terminal and the receiving terminal, and the sensing whether an image format error occurs in the image signal may include sensing the image format error based on a first error determination signal transmitted through a first lane among the plurality of lanes and a second error determination signal generated by copying the first error determination signal and transmitted through a second lane different from the first lane.

The sensing the image format error may include: recovering the image signal by synthesizing a third error determination signal, different from the first error determination signal and transmitted through a third lane different from the first and second lanes, with the first and second error determination signals; and sensing the image format error by determining whether the image format of the recovered image signal includes with a preset standard.

The first error determination signal, the second error determination signal and the third error determination signal may be obtained by dividing the image signal into signals respectively corresponding to the plurality of lanes. Thus, it is possible to more accurately detect whether there is an image format error in the image signal.

The sensing whether an image format error occurs in the image signal may include: applying noise to the transmitting terminal; and sensing the image format error of the image signal transmitted from the transmitting terminal to the receiving terminal under a condition that the noise is applied to the transmitting terminal. Thus, it is possible to enhance the quality of the image signal from the transmitting terminal so the image signal to be transmitted can be resistant to noise and improved in reliability.

The transmitting terminal may include: a transmitter configured to convert the image signal to be transmittable to the receiving terminal in accordance with a preset transmission interface protocol; and an image signal generator configured to generate and provide the image signal to the transmitter, and the controlling the transmitting terminal to recover the image signal from the image format error may include recovering the image signal from the image format error by resetting at least one of the transmitter and the image signal generator.

The preset transmission interface protocol may include V-by-One standards.

The controlling the transmitting terminal to recover the image signal from the image format error may include recovering the image signal from the image format error by resetting the whole transmitting terminal. Thus, it is possible to recover the image format of the image signal from the image format error.

The sensing whether the image format error occurs in the image signal may be performed in response to a preset event, and the preset event may happen if the image signal received in the receiving terminal is changed in resolution. Thus, it is possible to check the image format only if the image format error is expected in the image signal, without periodically detecting the image format error.

The transmitting terminal and the receiving terminal may be connected to each other so that the image signal can be transmitted through a transmission interface of, for example, V-by-One standards.

BRIEF DESCRIPTION OF THE DRAWINGS

The above and/or other aspects will become apparent and more readily appreciated from the following detailed description, taken in conjunction with the accompanying drawings, in which like reference numerals refer to like elements, and wherein:

FIG. 8 is a table illustrating an example number of lanes used corresponding to image data formats defined by a V×1 transmission interface protocol applied to the display apparatus according to the second example embodiment;

Figure 11:
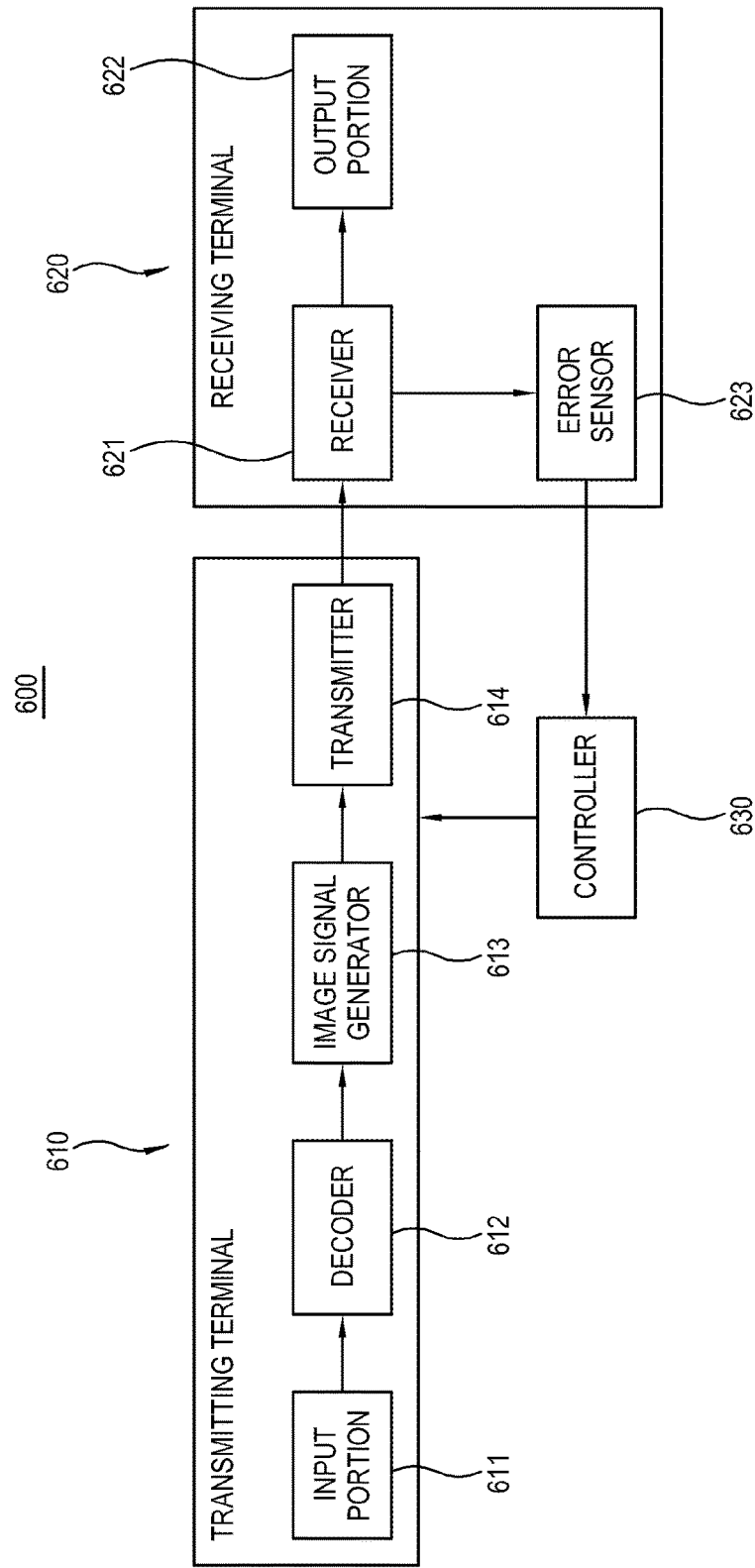
Figure 13:
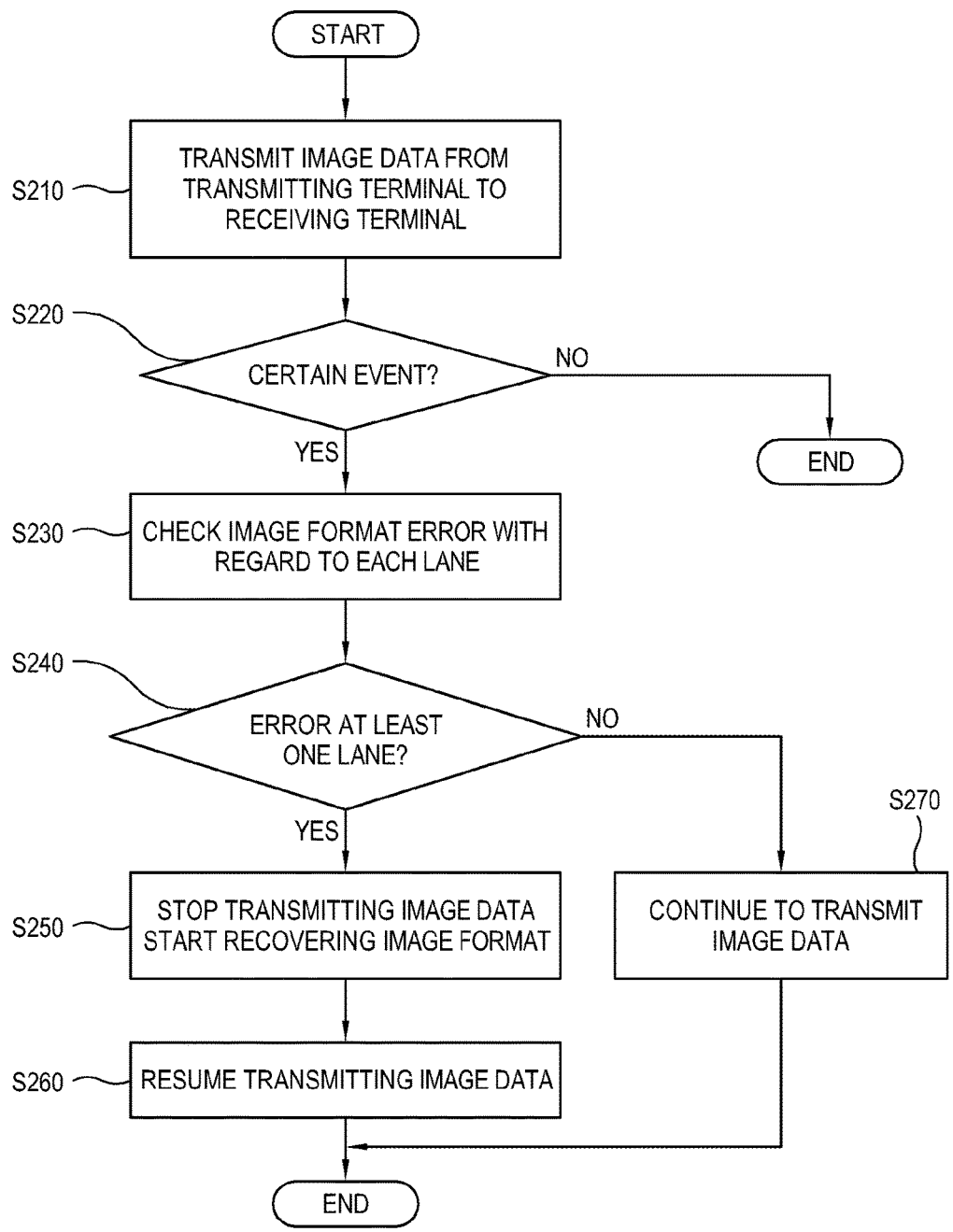
Figure 14:
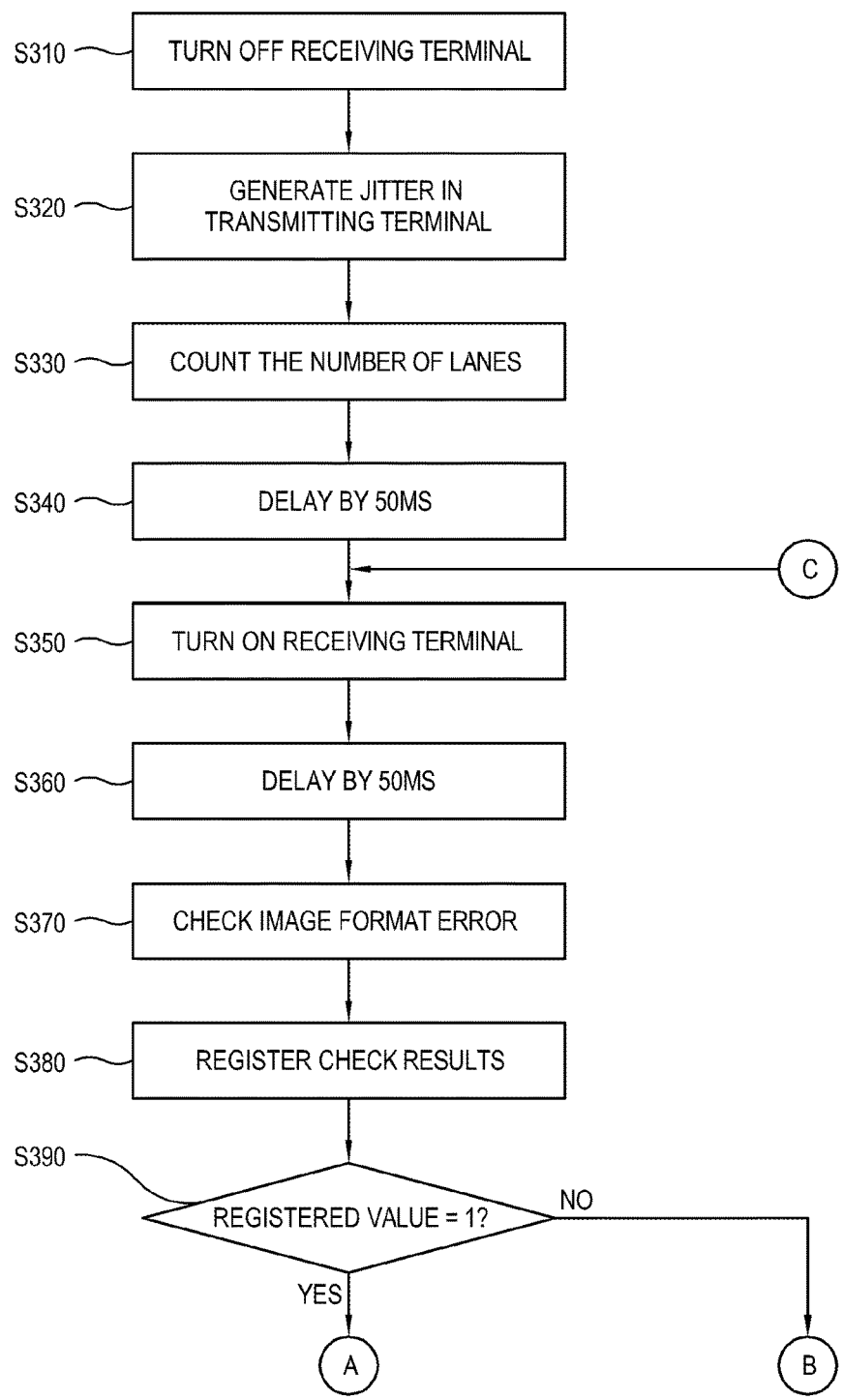
Figure 15:
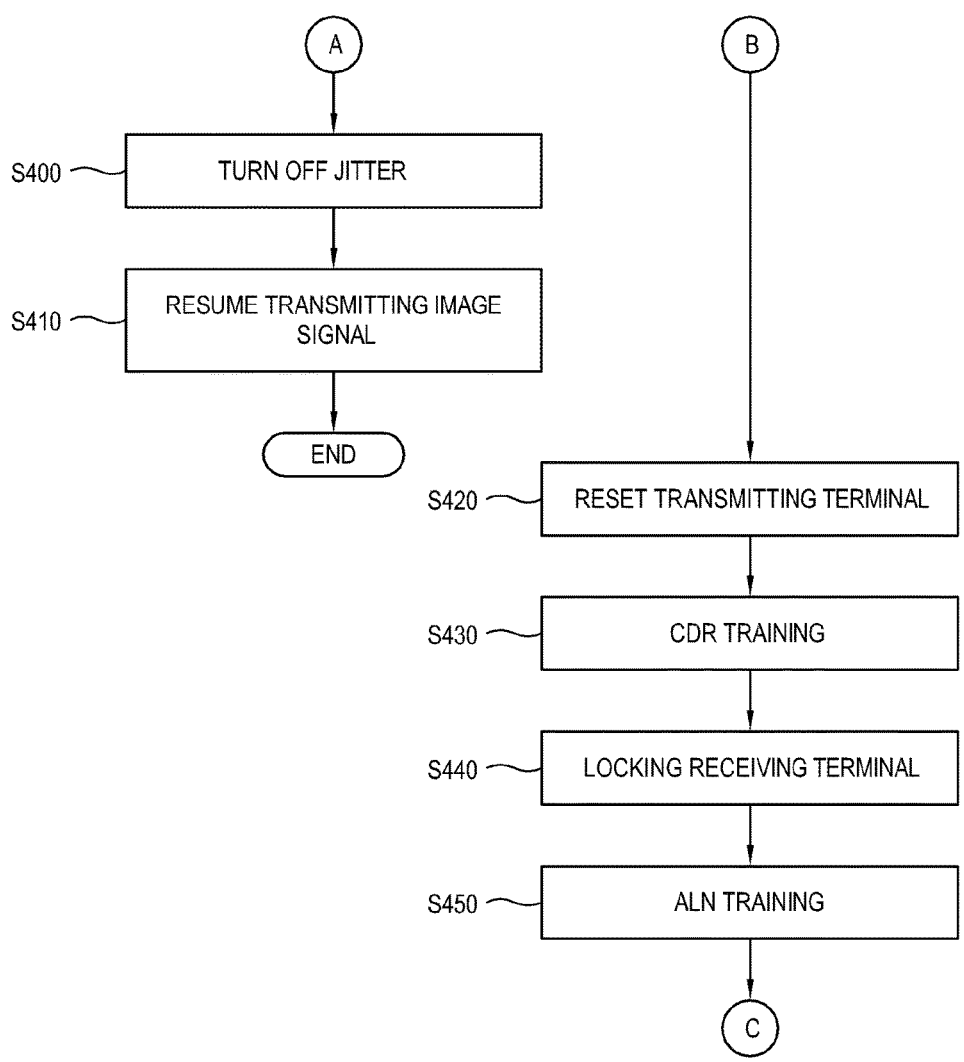
Figure 20:
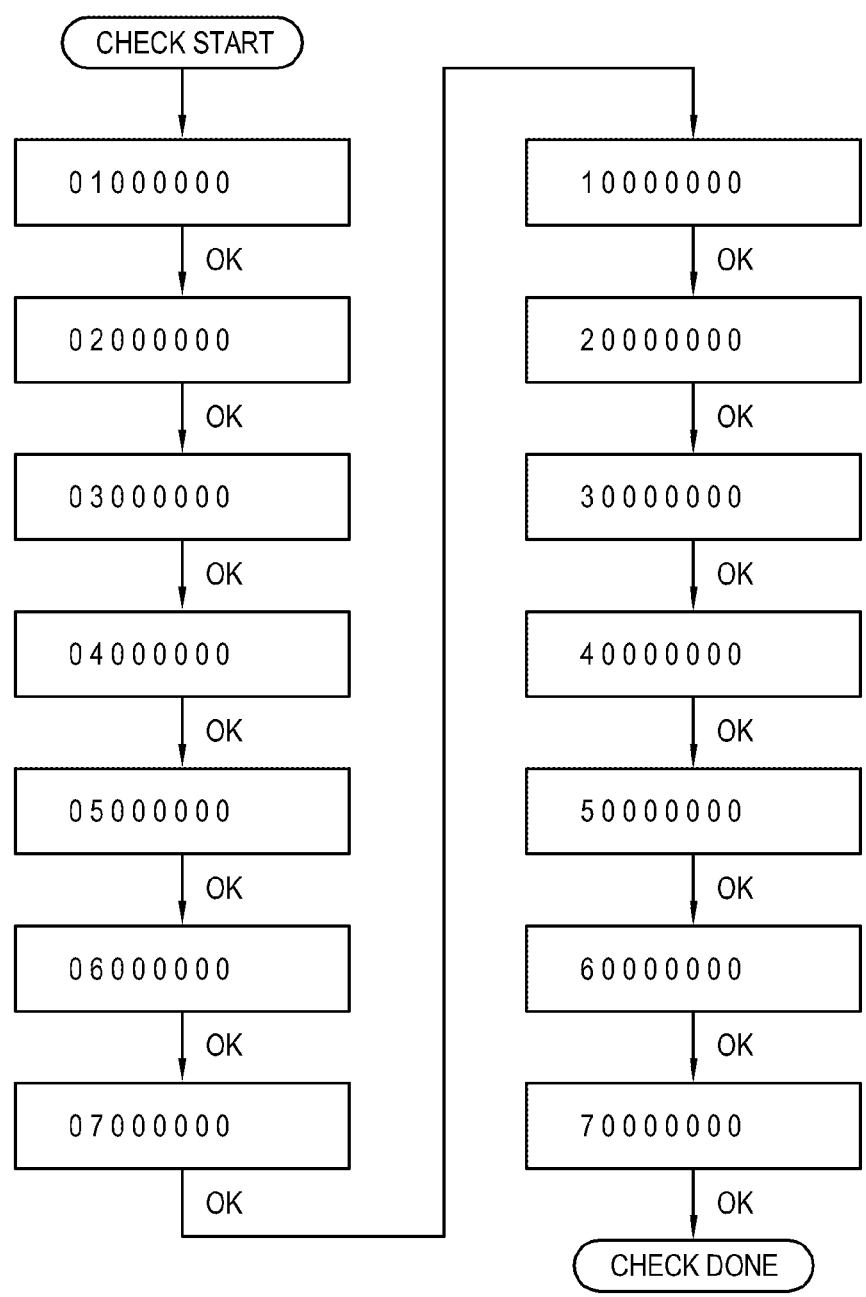
Figure 22:
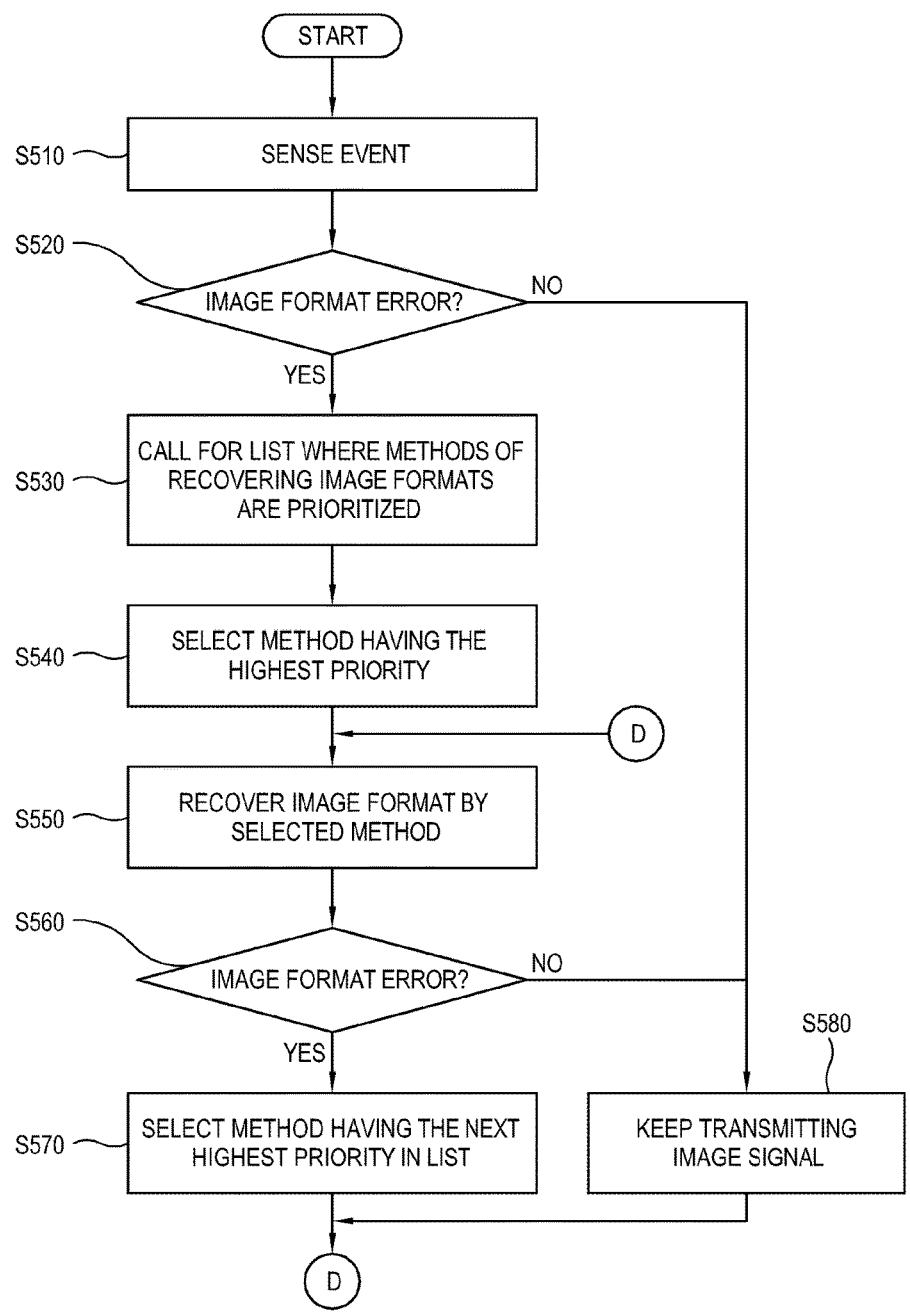
Figure 23:
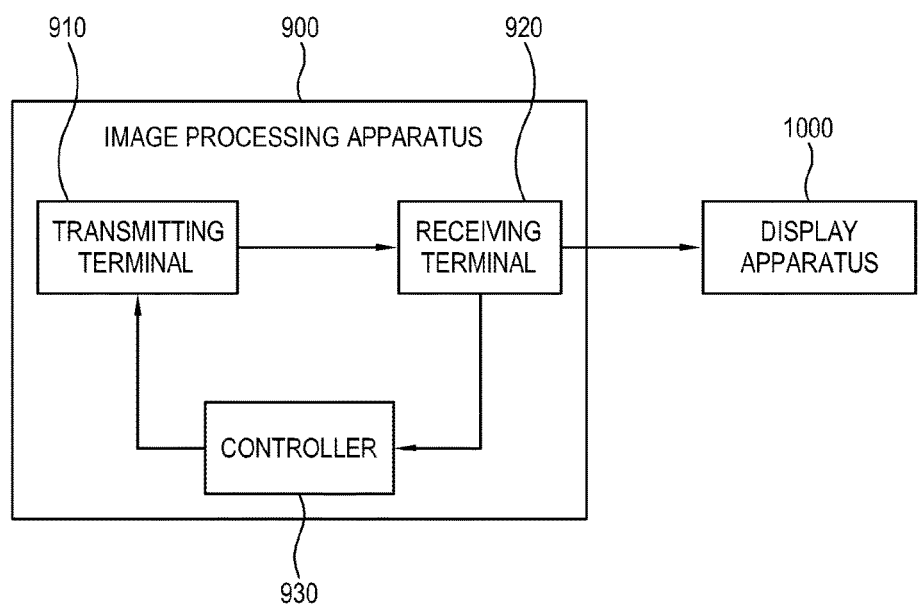
Figure 24:
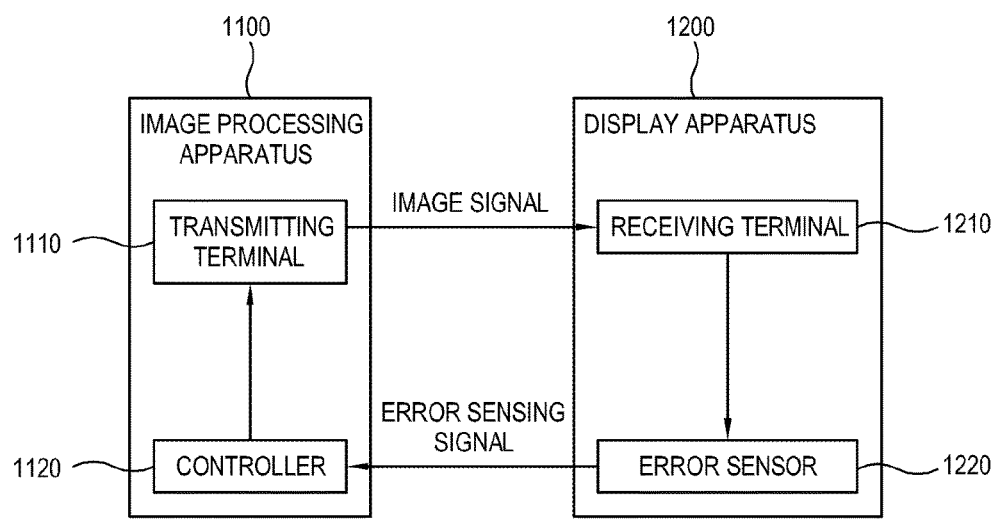

FIG. 11 is a block diagram illustrating an example of the V×1 interface based signal transmitted between a transmitting terminal and a receiving terminal of a display apparatus according to a third example embodiment;

FIG. 12 is a table illustrating example standards of a preset image format applied to the display apparatus according to the third example embodiment;

FIG. 13 is a flowchart illustrating an example of correcting an image format error that may occur when the display apparatus according to the third example embodiment transmits the image data through the V×1 transmission interface;

FIG. 14 and FIG. 15 are flowcharts illustrating an example of recovering an image format when a preset event happens in the receiving terminal of the display apparatus according to the third example embodiment;

FIG. 16 to FIG. 19 are diagrams illustrating a principle of generating a test signal to determine the image format error with regard to each lane in the display apparatus according to the third example embodiment;

FIG. 20 is a diagram illustrating example forms of a test signal in respective stages of a process for determining the image format error in the display apparatus according to the third example embodiment;

FIG. 21 is a table illustrating an example list, where methods of recovering an image format are listed according to priorities, to be referred to by a display apparatus according to a fourth example embodiment;

FIG. 22 is a flowchart illustrating an example of recovering the image format in the display apparatus according to the fourth example embodiment;

FIG. 23 is a block diagram illustrating an example image processing apparatus according to a fifth example embodiment; and FIG. 24 is a block diagram illustrating an example image processing apparatus and a display apparatus according to a sixth example embodiment.

DETAILED DESCRIPTION

Below, example embodiments will be described in greater detail with reference to accompanying drawings. The following descriptions of the example embodiments are made by referring to elements illustrated in the accompanying drawings, in which like numerals refer to like elements having substantively the same functions.

In the description of the example embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the idea of the disclosure.

Further, the example embodiments will describe only elements directly related to the idea of the disclosure, and description of the other elements will be omitted. However, it will be appreciated that the elements, the descriptions of which are omitted, are not unnecessary to realize the apparatus or system according to the example embodiments. In the following descriptions, terms such as "include" or "have" refer to presence of features, numbers, steps, operations, elements or combination thereof, and do not exclude presence or addition of one or more other features, numbers, steps, operations, elements or combination thereof.

Figure 1:
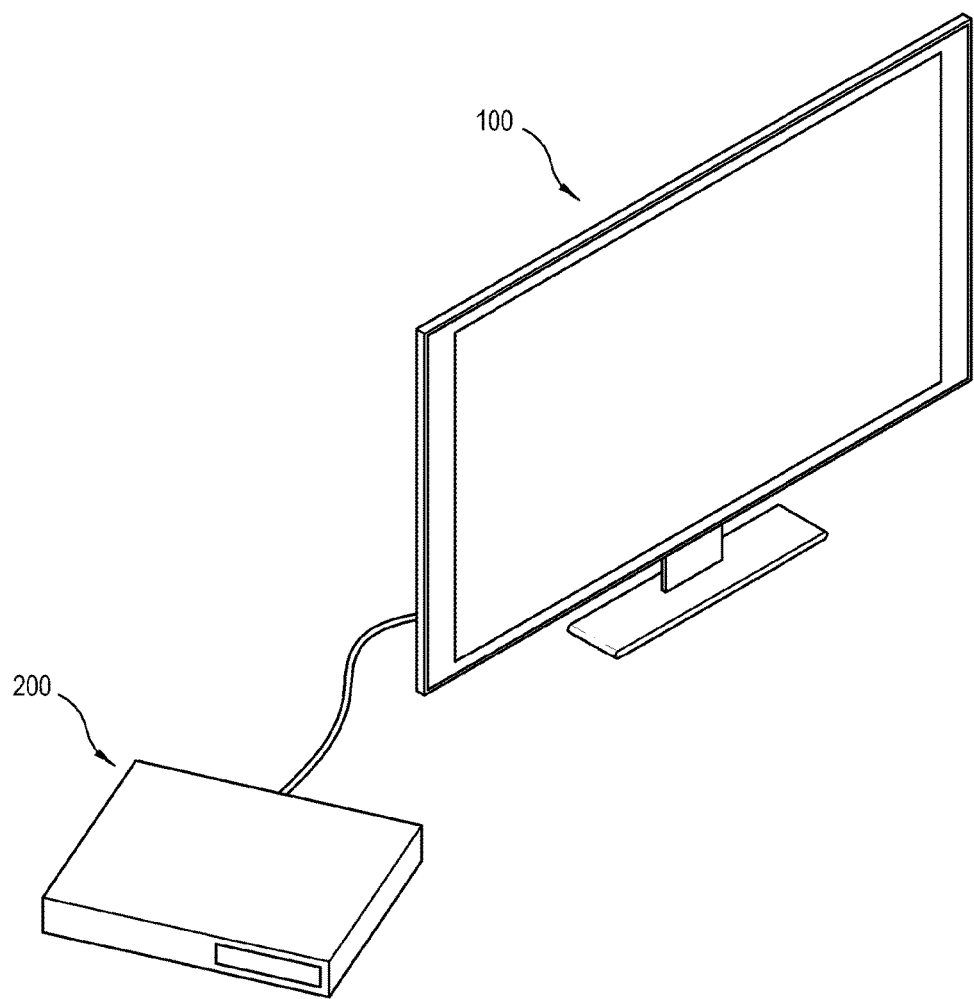
FIG. 1 is a diagram illustrating an example image processing apparatus according to a first example embodiment.

FIG. 1 is a diagram illustrating an example image processing apparatuses 100 and 200 according to a first example embodiment.

As illustrated in FIG. 1, the image processing apparatuses 100 and 200 may refer, for example, to all apparatuses capable of processing image data or an image signal in accordance with preset image processing processes. For example, the image processing apparatuses 100 and 200 may include an image reproducing apparatus 200 for reproducing and outputting image data, or a display apparatus 100 for displaying an image based on image data output from the image reproducing apparatus 200. Further, the image processing apparatuses 100 and 200 may include a set-top box (not shown) connected to the display apparatus 100, or a mobile device (not shown) easy to carry without being installed in stationary.

The display apparatus 100 receives image data from the image reproducing apparatus 200 and displays an image by processing the image data. Here, there are no limits to an image input source from which the image data is received. The display apparatus 100 may variously receive image data from many image input sources. For example, the display apparatus 100 may receive a broadcast signal from an radio frequency (RF) antenna (not shown), the set-top box (not shown), etc. As a general example of the display apparatus 100, there is a television (TV).

The image reproducing apparatus 200 reads image data recorded in an optical disc and the like storage medium and outputs the read image data to the display apparatus 100, so that the display apparatus 100 can display an image based on the image data. The image reproducing apparatus 200 includes a digital versatile disc (DVD) player, a Blu-ray disc (BD) player, etc. classified with respect to recording media, and includes an ultra-high definition (UHD) player, etc. classified with respect to resolutions of the image data.

The quality of UHD image data is higher resolution and pixels four times than that of full-high definition (FHD) image data. For example, high definition (HD) image data has a resolution of 1366×768 corresponding to about 1 million pixels, FHD image data has a resolution of 1920×1080 corresponding to about 2 million pixels, and UHD image data has a resolution of 3840×2160 corresponding to about 8 million pixels in case of 4K and a resolution of 7680×4320 corresponding to about 33 million pixels in case of 8K.

To transfer the image data having such a high resolution inside the image reproducing apparatus 200, inside the display apparatus 100, or between the image reproducing apparatus 200 and the display apparatus 100, a data transmission interface protocol is previously applied. As an example of such an interface protocol, there is low-voltage differential signaling (LVDS).

Below, the display apparatus 100 will be described as an example of one between the image processing apparatuses 100 and 200.

Figure 2:
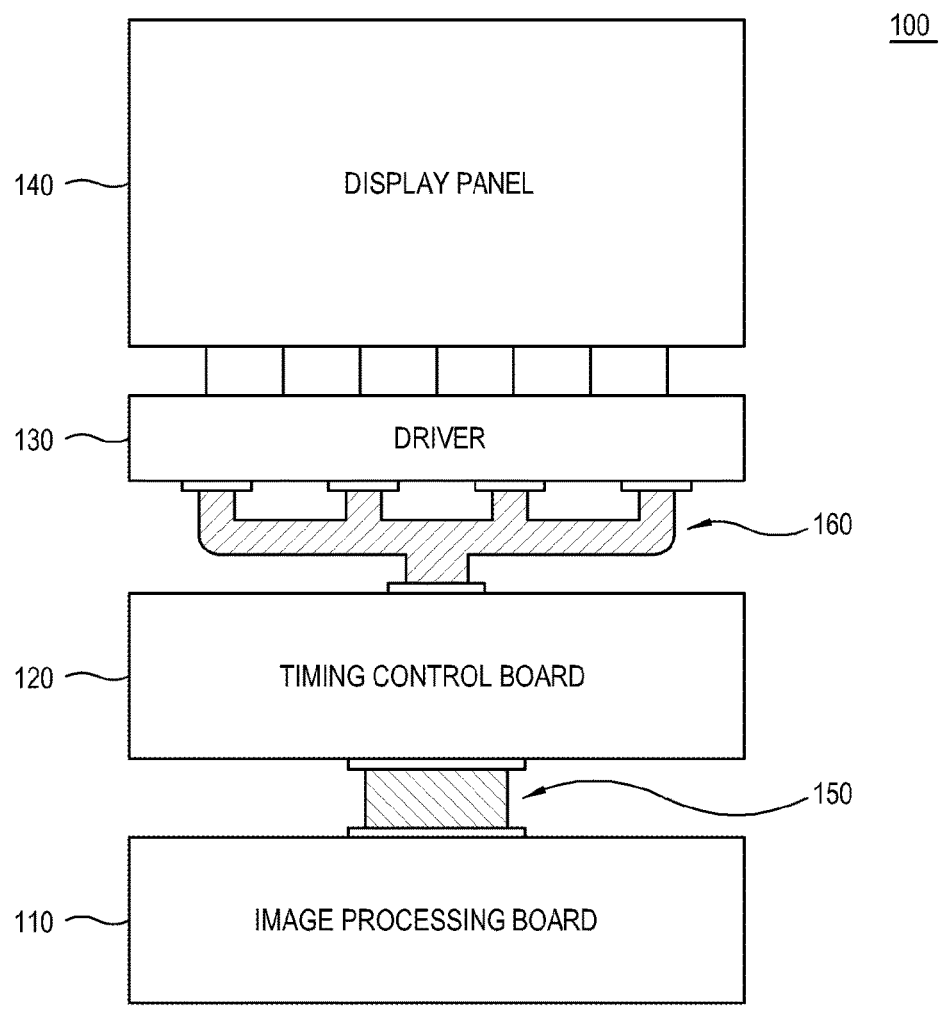
FIG. 2 is a diagram illustrating an example inner board structure of the display apparatus according to the first example embodiment.

FIG. 2 is a diagram illustrating an inner board structure of the display apparatus 100 according to the first example embodiment.

As illustrated in FIG. 2, the display apparatus 100 includes an image processing board (e.g., including image processing circuitry) 110 for processing image data, a timing control board (e.g., including timing control circuitry) 120 for generating a driving control signal corresponding to an image signal received from the image processing board 110, a driver (e.g., including driving circuitry) 130 for driving a display panel 140 in response to the driving control signal output from the timing control board 120, and the display panel 140 driven by the driver 140 to display an image based on the image data.

The display panel 140 in this example embodiment has a structure of a liquid crystal display (LCD) panel, but the present disclosure concept is not limited thereto.

In addition, cables 150 and 160 complying with a preset data transmission interface protocol are installed between the image processing board 110 and the timing control board 120 and between the timing control board 120 and the driver 130. Through the cables 150 and 160, data is transmitted from the image processing board 110 to the timing control board 120 and from the timing control board 120 to the driver 130.

The image processing board 110 processes input image data in accordance with various image processing processes implemented by various image processing circuitry and outputs the processed image data to the timing control board 120. There are no limits to the kind of image processing process performed in the image processing board 110, and the image processing process may for example include demultiplexing for separating the transport stream into sub streams such as an image signal, an audio signal and additional data, decoding corresponding to video formats of an image signal, scaling for adjusting an image signal to have a preset resolution, noise reduction for improving image quality, detail enhancement, frame refresh rate conversion, etc.

The image processing board 110 may perform various processes in accordance with the kinds and characteristics of data as well as the foregoing image processing process. The image processing board 110 may be achieved by various circuitry that may be mounted on a system-on-chip (SoC), where such various functions are integrated into a single chip, and individual chipsets including image processing circuitry for independently performing processes, on to a printed circuit board.

The timing control board 120, which is also called a T-Con board, includes timing control circuitry that adjusts the amount of data to be transferred to the driver 130 and controls respective driving chips (not shown) of the driver 130. The timing control board 120 transmits image data from the image processing board 110 to the respective chips (not shown).

The timing control board 120 has come into request necessity as the display panel 140 becomes larger. If the display panel 140 is small, the timing control board 120 may be unnecessary. On the other hand, if the display panel 140 is large, a time lag occurs in transmitting the image data to the display panel 140. Such a time lag causes an afterimage on a screen. To prevent the afterimage, the timing control board 120 controls the driver 130 to thereby adjust timing of transmitting the image data with respect to respective channels of the display panel 140.

The driver 130 is provided corresponding to the respective channels of the display panel 140 and includes a plurality of driving chips (not shown) including driving circuitry arranged along an edge of the display panel 140. The driver 130 drives the display panel 140 to display an image thereon. Specifically, the driver 130 includes a gate driving integrated circuit (IC) (not shown) connected to a gate line (not shown) of the display panel 140, and a data chip film package (not shown) connected to a data line (not shown) of the display panel 140. With this structure, the driver 130 inputs driving signals to the gate line (not shown) and the data line (not shown) of the display panel 140, respectively, so that a liquid crystal layer (not shown) of the display panel 140 can be driven in units of pixels, thereby displaying an image.

The display panel 140 is driven by the driver 130 to display an image thereon. If the display panel 140 has an LCD panel structure, a liquid crystal layer (not shown) is sandwiched in between two transparent substrates (not shown) and orientation of liquid crystal is changed in response to a driving signal, thereby displaying an image on the display panel 140. Since the LCD panel structure cannot emit light in itself, the display panel 140 receives light from a backlight unit (not shown) in order to display an image.

Figure 3:
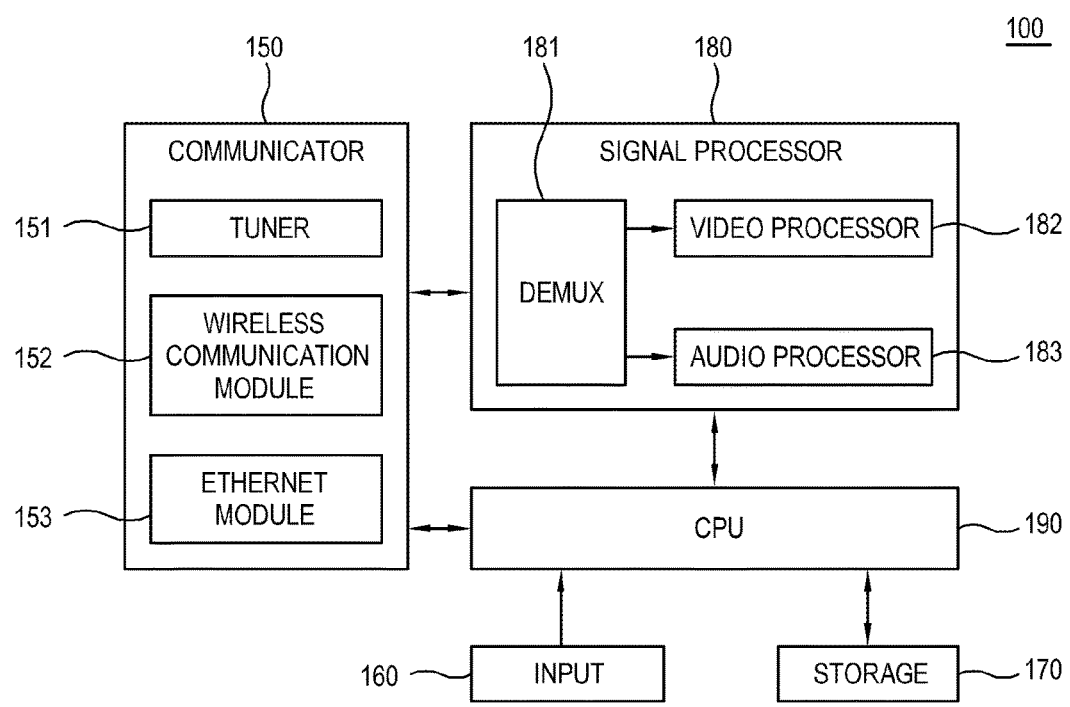
FIG. 3 is a block diagram illustrating an example display apparatus according to the first example embodiment.

FIG. 3 is a block diagram illustrating an example display apparatus 100 according to the first example embodiment.

As illustrated in FIG. 3, the display apparatus 100 includes a communicator (e.g., including communication circuitry) 150 for communicating with the exterior, an input (e.g., including input circuitry) 160 for allowing a user to make an input, a storage 170 for storing data, a signal processor 180 for processing a transport stream, and a central processing unit (CPU) 190 for computing operations of the signal processor 180 and controlling the display apparatus 100.

In this embodiment, the signal processor 180 and the CPU 190 are provided on the image processing board 110 (see FIG. 2). Further, the communicator 150 and the storage 170 may be additionally provided on the image processing board 110 (see FIG. 2) or provided separately from the image processing board 110 (see FIG. 2) in accordance with designs of the display apparatus 100.

Further, the CPU 190 in this example embodiment is provided separately from the signal processor 180, but not limited thereto. Alternatively, the CPU 190 may be integrated into the signal processor 180 or the like chipset as a single SOC.

The communicator 150 may include various communication circuitry that performs interactive communication, thereby receiving a transport stream from various image sources or transmitting data from the signal processor 180 to the exterior. The communicator 150 is achieved by communication ports respectively corresponding to a plurality of communication standards or by an assembly of communication modules. There are no limits to the kinds or types of supportable protocols and communication targets of the communicator 150. For example, the communicator 150 includes communication circuitry, such as, for example, and without limitation, a tuner 151 to be tuned to a certain frequency for a broadcast stream, a wireless communication module 152 for wireless communication with the exterior, and an Ethernet module 153 for wired communication with the exterior, and thus transmits and receives data in various communication modes.

The tuner 151 is tuned to a frequency of a selected channel for a broadcast stream to receive the broadcast stream, and converts the received broadcast stream into a transport stream. The tuner 151 converts a radio frequency carrier wave into an intermediate frequency band signal, and converts it into a digital signal, thereby generating a transport stream. To this end, the tuner 151 may have an analog/digital (A/D) converter (not shown). In accordance with designs, the A/D converter (not shown) may be included in not the tuner 151 but a demodulator (not shown).

The wireless communication module 152 performs wireless communication based on various protocols. Such a protocol includes wireless fidelity (Wi-Fi), Wi-Fi Direct, Bluetooth, universal plug and play (UPNP), near field communication (NFC), etc. The wireless communication module 152 includes unit modules for communications in accordance with respective support protocols.

The input 160 may include various input circuitry that transmits various preset control command or information to the CPU 190 or the signal processor 180 in accordance with a user's manipulation or input. The input 160 may be variously achieved in accordance with methods of inputting information. For example, the input 160 may include various input circuitry, such as, for example, and without limitation, a button provided on an outer side of the display apparatus 100, a touch screen, a microphone for receiving a user's speech sounds, a camera for photographing or sensing surroundings of the display apparatus 100, a remote controller separated from the display apparatus 100, etc.

The storage 170 stores a variety of pieces of data under the process and control of the CPU 190 and the signal processor 180. Thus, the CPU 190 accesses the storage 170 and performs reading, writing, editing, deleting, updating, etc. with regard to the data stored in the storage 170. The storage 170 may be achieved by a flash memory, a hard disc drive, a solid state drive (SSD) or the like non-volatile memory for retaining data regardless of whether the display apparatus 100 is turned on or off.

The signal processor 180 performs various processes with respect to the transport stream received in the communicator 150. When the transport stream is received in the communicator 150, the signal processor 180 extracts and processes one or more sub streams from the transport stream.

Since the signal processor 180 is configured to perform various processes in accordance with the kinds and characteristics of signal, steam or data, the process performable by the signal processor 180 is not limited to the video processing process. Further, data processible by the signal processor 180 is not limited to only data received in the communicator 150. For example, the signal processor 180 performs an audio processing process with regard to an audio signal extracted from a transport stream, and outputs the processed audio signal to a loudspeaker (not shown). Further, if the display apparatus 100 receives sounds that a user utters, the signal processor 180 may process the received sound in accordance with a preset voice recognition processing process.

The display apparatus 100 may include such hardware components, details of which are varied depending on the types and support functions of the display apparatus 100. For example, if the display apparatus 100 is a TV, a tuner 151 is necessary to be tuned to a certain frequency of a broadcast signal. On the other hand, if the display apparatus 100 is a tablet PC, the tuner 151 may be excluded.

The signal processor 180 includes a demux 181 for dividing the transport steam from the communicator 150 into a plurality of sub streams, a video processor 182 for processing a video signal among the sub streams from the demux 181 in accordance with video processing processes, and an audio processor 183 for processing an audio signal among the sub streams from the demux 181 in accordance with audio processing processes. However, the elements included in the signal processor 180 are not limited to only the demux 181, the video processor 182 and the audio processor 183. Alternatively, the signal processor 180 may include additional elements when is realized as a product.

The demux (or demultiplexer) 181 performs a reverse operation of the multiplexer (not shown). That is, the demux 181 connects one input terminal with a plurality of output terminals, and distributes a stream input to the input terminal to the respective output terminals in accordance with selection signals. For example, if there are four output terminals with respect to one input terminal, the demux 181 may select each of the four output terminals by combination of selection signals having two levels of 0 and 1. In the case where the demux 181 is applied to the display apparatus 100, the demux 181 divides the transport stream received from the communicator 150 into the sub signals of a video signal and an audio signal and outputs them to the respective output terminals.

The demux 181 may use various methods to divide the transport stream into the sub signals. For example, the demux 181 divides the transport stream into the sub streams in accordance with packet identifiers (PID) given to packets in the transport stream. The sub streams in the transport stream are independently compressed and packetized according to channels, and the same PID is given to the packets corresponding to one channel so as to be distinguished from the packets corresponding to another channel. The demux 181 classifies the packets in the transport stream according to the PID, and extracts the sub streams having the same PID.

The video processor 182 applies decoding and scaling to a video signal output from the demux 181 so that the video signal can be displayed as an image. To this end, the video processor 182 includes a decoder (not shown) that returns the video signal to a state before an encoding process by performing an opposite process to the encoding process with regard to the video signal encoded by a certain format, and a scaler (not shown) that scales the decoded video signal in accordance with the resolution of the display panel (not shown) or a separately designated resolution. If the video signal output from the demux 181 is not encoded by a certain format, i.e. not compressed, the decoder (not shown) of the video processor 182 does not process this image signal.

The audio processor 183 amplifies an audio signal output from the demux 181 and outputs a sound based on the amplified audio signal through the loudspeaker (not shown). To this end, the audio processor 183 includes a digital signal supplier (not shown) for outputting a digital audio signal; a pulse width modulation (PWM) processor (not shown) for outputting a PWM signal based on a digital signal output from the digital signal supplier (not shown), an amplifier (not shown) for amplifying the PWM signal output from the PWM processor (not shown), and an LC filter (not shown) for filtering the PWM signal amplified by the amplifier (not shown) by a predetermined frequency band to thereby demodulate the PWM signal.

The CPU 190 is an element for performing central calculation to operate general elements in the signal processor 180, and plays a central role in basically parsing and calculating data. The CPU 190 internally includes a processor register (not shown) in which commands to be processed are stored; an arithmetic logic unit (ALU) (not shown) being in charge of comparison, determination and calculation; a control unit (not shown) for internally controlling the CPU 190 to analyze and carry out the commands; an internal bus (not shown), a cache (not shown), etc.

The CPU 190 performs calculation needed for operating the elements of the signal processor 180, such as the demux 181, the video processor 182 and the audio processor 183. Alternatively, some elements of the signal processor 180 may be designed to operate without the data computation of the CPU 190 or by a separate microcontroller (not shown).

Figure 4:
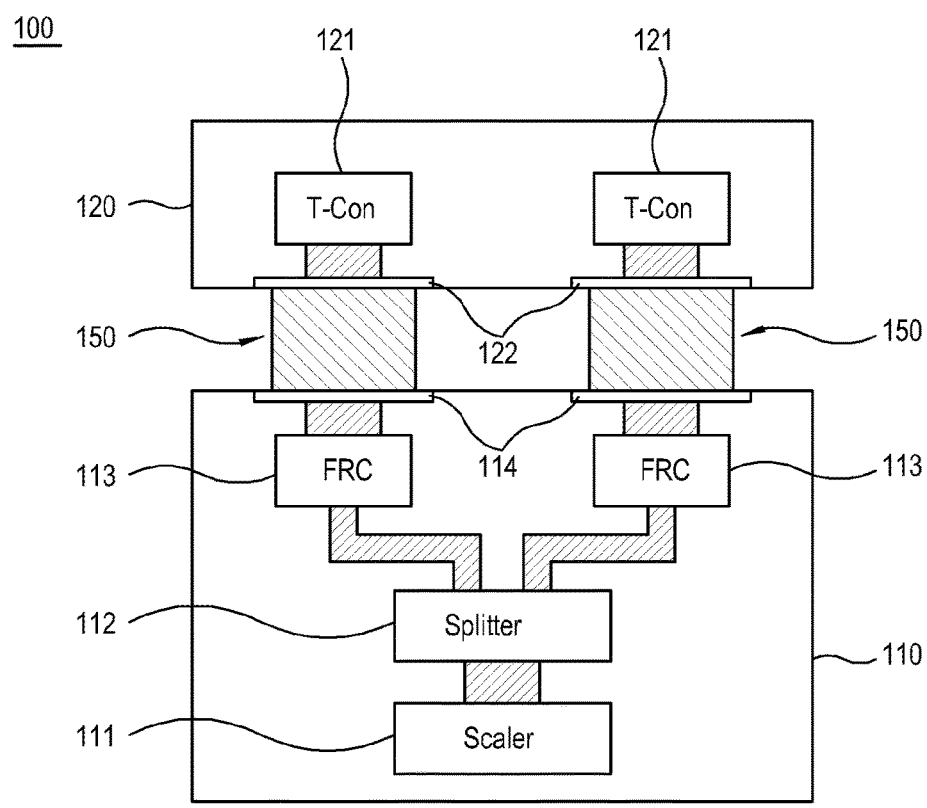
FIG. 4 is a diagram illustrating an example connection between a timing control board and an image processing board in a low voltage differential signaling (LVDS) mode of a display apparatus according to the first example embodiment.

FIG. 4 is a diagram illustrating an example connection between the timing control board 120 and the image processing board 110 in a low voltage differential signaling (LVDS) mode of the display apparatus 100 according to the first example embodiment.

As illustrated in FIG. 4, the image processing board 110 transmits image data to the timing control board 120 through a cable 150, in which the image data is transmitted in the LVDS mode.

The image processing board 110 includes a scaler 111 for scaling image data, a splitter 112 for splitting the image data from the scaler 111, and a frame rate converter 113 for converting a frame rate of the image data split by the splitter 112. In addition, the timing control board 120 includes a plurality of timing controllers 121.

The image data output from the FRC 113 is transmitted to the timing controller 121 through the cable 150 connecting a connector 114 and a connector 122 in an LVDS interface mode. Below, the LVDS mode will be described briefly.

The LVDS is a high-speed digital interface which consumes low power and resists noise to transmit data at high speed. After approving the ANSI/TIA/EIA-644 standard, LVDS has been employed in various applications. The ANSI/TIA/EIA-644 standard defines not a certain communication protocol, a required process technique, a medium, voltage supply, etc. but only driver output of the LVDS interface and electric characteristics of receiver input. Therefore, the LVDS is applicable to various fields since it is a multi-purpose interface and does not specialize in a certain application.

Since a differential signal is transmitted through the cable in the LVDS mode, the cable 150 needs two lines, e.g., a pair of lines in order to transmit one differential signal. Here, one pair of lines will be called a lane. For example, 96 lines, i.e. 48 lanes are needed to transmit FHD image data of 1080p at 240 Hz. As the image data has been changed from FHD to UHD, there are needed more lanes than 48 lanes. Accordingly, the connectors 114 and 122 increase in the number of pins and the cable 150 increases in width, and it is thus difficult to design a wiring line layouts of the image processing board 110 and the timing control board 120.

In this regard, instead of the LVDS mode, a V-by-One (V×1) mode may be used as the interface standard for transmitting the image data. Below, difference between the LVDS mode and the V×1 mode will be described.

Figure 5:
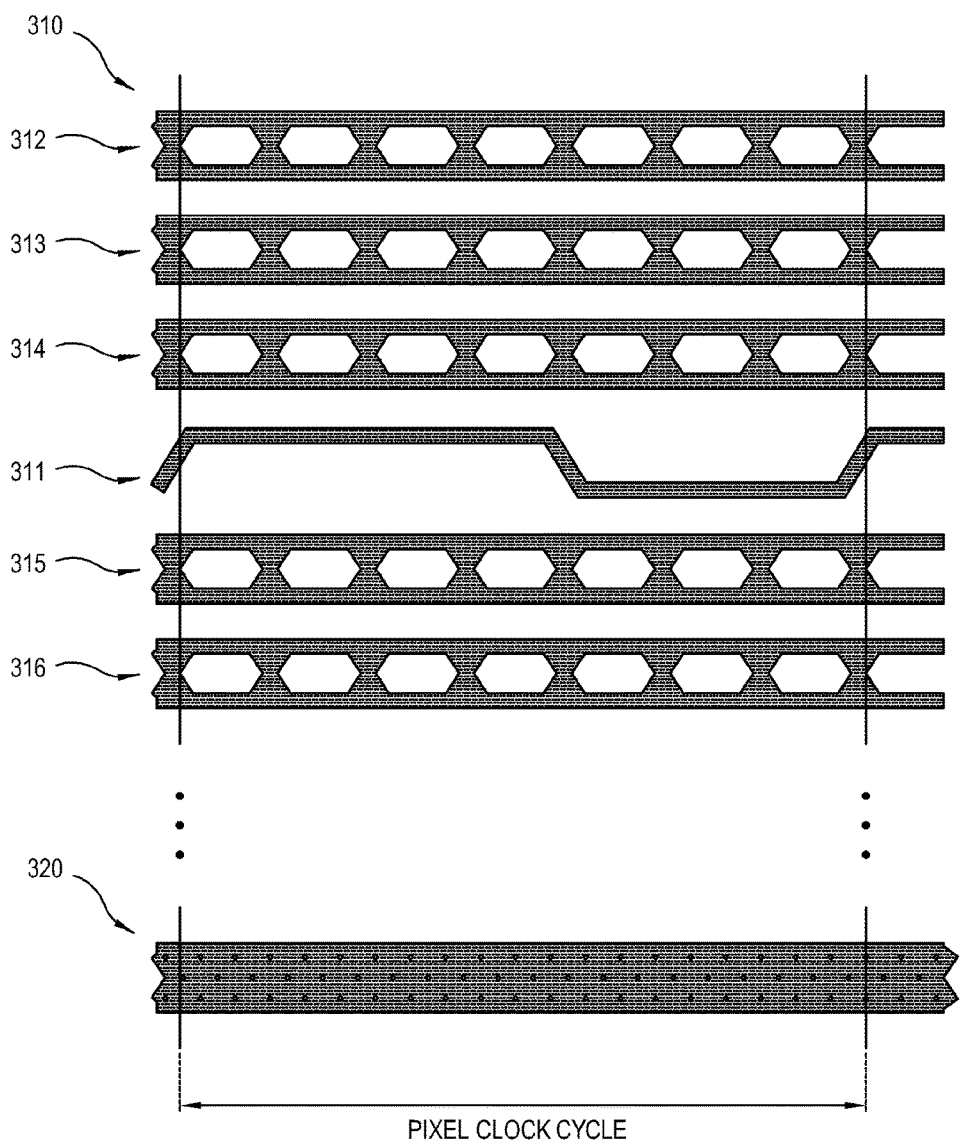
FIG. 5 is a diagram illustrating respective example signal forms in the LVDS mode and a V×1 mode of the display apparatus according to the first example embodiment.

FIG. 5 is a diagram illustrating respective example signal forms in the LVDS mode and the V×1 mode of the display apparatus according to the first example embodiment.

As illustrated in FIG. 5, within one cycle of a pixel clock, a transmission interface 310 of the LVDS mode is capable of transmitting image data of RGB 30 bits at 525 Mbps through 6 lanes. At this time, one among 6 lanes is used in transmitting a clock signal 311, and the other 5 lanes are used in transmitting data signals 312, 313, 314, 315 and 316.

By the way, the transmission interface 310 of the LVDS mode has a problem that one lane of transmitting the clock signal 311 causes electromagnetic interference (EMI) to be generated in the cable. In other words, the clock signal 311 has high energy concentrated at a certain frequency, and therefore the concentrated energy is radiated as the EMI from the lane through which the clock signal 311 is transmitted.

Like this, the transmission interface 310 of the LVDS mode has problems that the structure for transmitting image data of high resolutions is complicated, and the EMI is radiated due to a lane structure dedicated for transmitting the clock signal 311.

On the other hand, a transmission interface 320 of the V×1 mode employs only one lane to transmit image data of RGB 30 bits at 3 Gbps within one cycle of a pixel clock. Here, an image signal to be transmitted by the transmission interface 320 of the V×1 mode contains a clock signal between data signals.

That is, the transmission interface 320 of the V×1 mode is different from the transmission interface 310 of the LVDS mode in raising the speed of transmitting image data per unit time and embedding the clock signal in the image data instead of using the dedicated lane.

Thus, the transmission interface 320 of the V×1 mode not only has a simple structure and reduces costs since the number of data transmission lanes is relatively decreased, but also reduces the EMI since the clock signal is not separately transmitted.

Further, the transmission interface 310 of the LVDS mode may have a skewing problem that the clock signal 311 and the data signals 312, 313, 314, 315 and 316 are not synchronized due to various causes such as difference in length between the wiring lines on the board (not shown). On the other hand, the transmission interface 320 of the V×1 mode is free from such a skewing problem since it does not have the structure of using one lane dedicated for transmitting the clock signal.

FIG. 5 illustrates that the transmission interface 320 of the V×1 mode includes only one lane for transmitting the image signal. This means that the image signals transmitted through six lanes in the transmission interface 310 of the LVDS mode are transmitted through one lane in the transmission interface 320 of the V×1 mode, and does not mean that the transmission interface 320 of the V×1 mode requires only one lane. If image data of a high resolution is transmitted, the transmission interface 320 of the V×1 mode may need the number of lanes corresponding to the high resolution.

Figure 6:
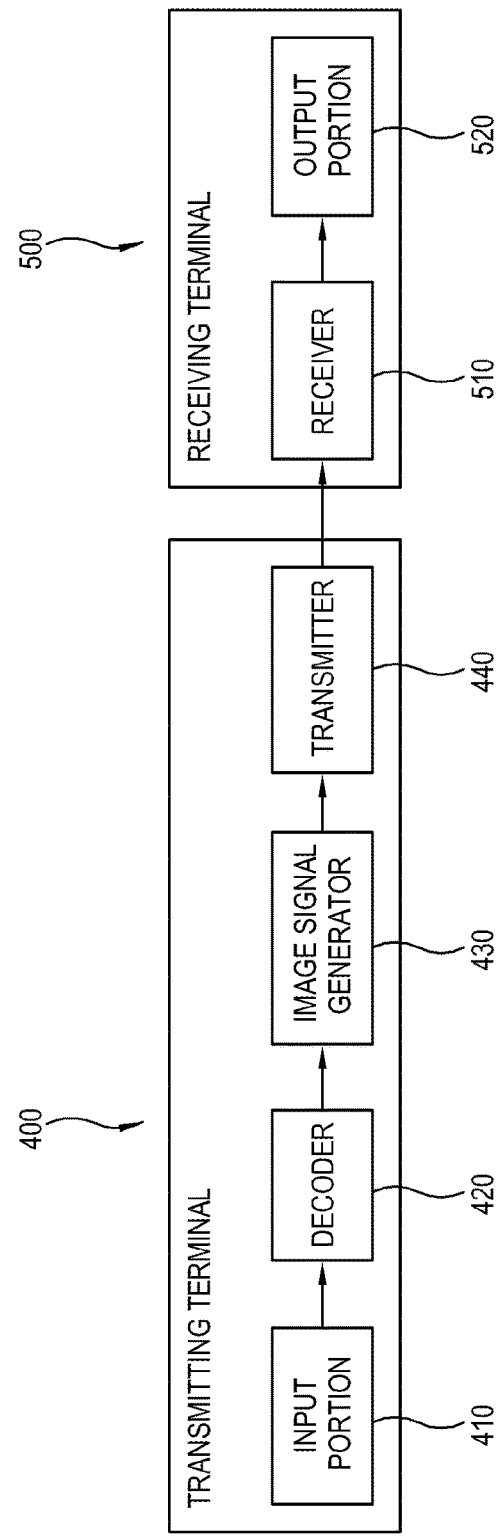
FIG. 6 is a block diagram illustrating an example V×1 interface based signal is transmitted between a transmitting terminal and a receiving terminal of a display apparatus according to a second example embodiment.

FIG. 6 is a block diagram illustrating that a V×1 interface based signal is transmitted between a transmitting terminal 400 and a receiving terminal 500 of a display apparatus according to a second example embodiment.

As illustrated in FIG. 6, the display apparatus according to the second example embodiment has a structure for transmitting image data between the transmitting terminal 400 and the receiving terminal 500. Here, the transmitting terminal 400 and the receiving terminal 500 are just named for convenience in connection with transmitting and receiving the image data, and the transmitting terminal 400 and the receiving terminal 500 may have various structures within the structure of the display apparatus. For example, if the transmitting terminal 400 is the image processing board 110 (see FIG. 2), the receiving terminal 500 may be the timing control board 120 (See FIG. 2). If the transmitting terminal 400 is the timing control board (120, see FIG. 2), the receiving terminal 500 may be the driver 130 (see FIG. 2).

The transmitting terminal 400 includes an input portion 410, a decoder 420, an image signal generator 430, and a transmitter 440. The receiving terminal 500 includes a receiver 510 and an output portion 520.

The input portion 410 receives an encoded image signal from various image input sources such as a Blu-ray, a DVD or the like optical disc, a universal serial bus (USB) memory, network streaming, etc.

The decoder 420 decodes the encoded image signal received in the input portion 410.

The image signal generator 430 converts an image signal based on an interface standard previously defined for transmitting an image signal. In general, the image transmission protocol, such as HDMI, used in transmitting a digital image signal complies with the CEA-861 protocol. The CEA-861 protocol is a standard related to a section for practically transmitting an image signal, a sync signal, a data enable (DE) signal, etc.

The transmitter 440 converts an image signal generated by conversion in the image signal generator 430 into a signal of a V×1 interface format. The V×1 interface is one of the interface protocols for transmitting data at high speed as described above, and is suitable for transmitting an image signal of high resolution and large data. The transmitter 440 includes a plurality of differential signal lanes, each of which has two differential signal lines, and uses them to transmit the image signal.

As an image signal has higher resolution and larger data, the transmitter 440 needs more lanes to transmit the image signal. For example, the transmitter 440 uses one lane to transmit image data of 720p at 60 Hz, and uses eight lanes to transmit image data of 2160p at 60 Hz. When the image data of 2160p is transmitted at 60 Hz, the transmitter 440 splits the image data into eight pieces respectively corresponding to the lanes, and transmits each split piece of the image data through the respective lanes.

The receiver 510 receives an image signal from the transmitter 440 in accordance with the V×1 interface. For example, the receiver 510 receives the image signal of 3840×2160 at 60 Hz from the transmitter 440 through eight lanes at the same time, and combines the image signals received through the respective lanes, thereby restoring or reproducing the image signal of 3840×2160 at 60 Hz.

The output portion 520 outputs the image signal recovered by the receiver 510.

Figure 7:
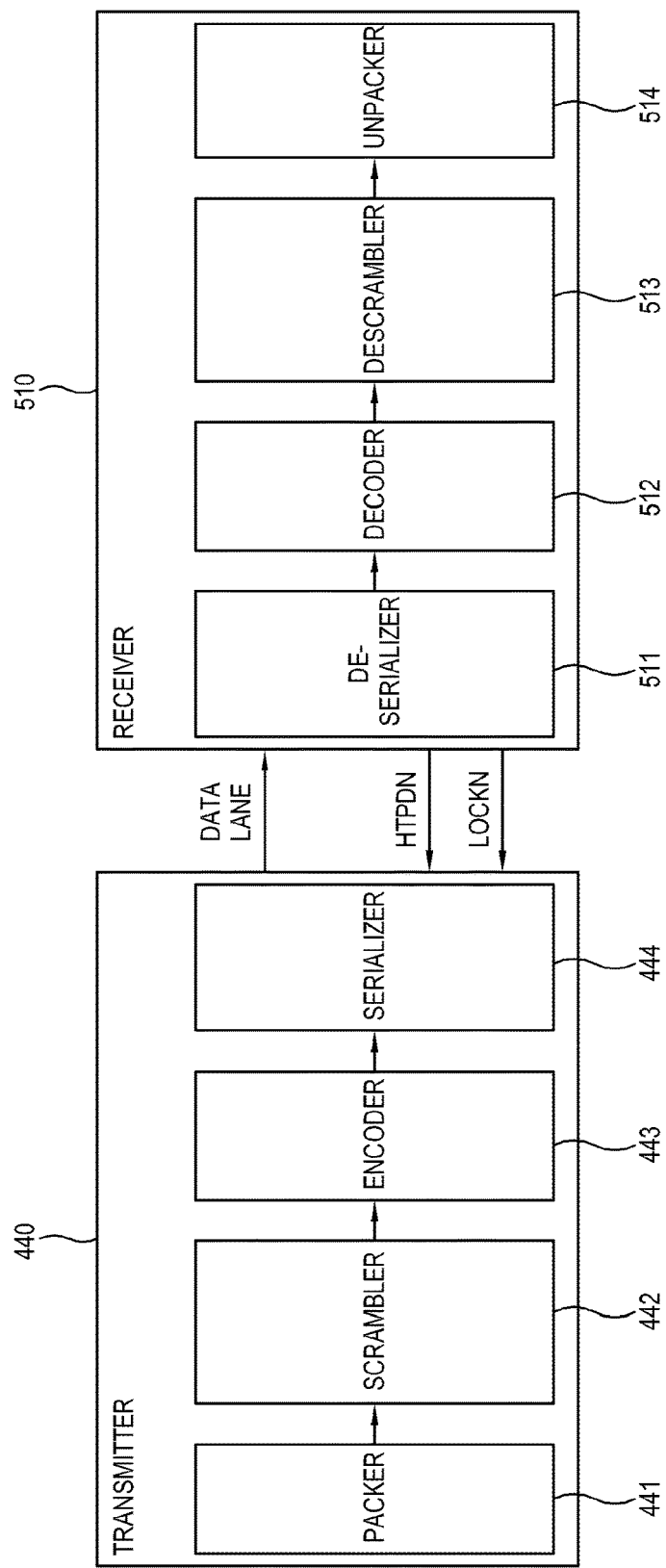
FIG. 7 is a block diagram illustrating example details of a transmitter and a receiver illustrated in FIG. 6.

FIG. 7 is a block diagram illustrating example details of a transmitter 440 and a receiver 510 illustrated in FIG. 6.

As illustrated in FIG. 7, the transmitter 440 includes a packer 441, a scrambler 442, an encoder 443, and a serializer 444. The receiver 510 includes a de-serializer 511, a decoder 512, a de-scrambler 513 and an unpacker 514 corresponding to the elements of the transmitter 440. Here, the decoder 512 of FIG. 7 and the decoder 420 of FIG. 6 are called by the same name but different in function.

For example, if data of 36 bits, a sync signal and a pixel clock are input to the packer 441, the packer 441 generates it as a packet of 3 to 5 bytes per pixel.

The scrambler 442 performs an XOR process based on a preset scrambler state, and thus scrambles original data. The scrambler state serves as a kind of key for scrambling the data, and may be given differently according to pixels.

For example, if original data of a first pixel is [11111111] and its scrambler state is [00000000], the scrambled data is [11111111]. If original data of a second pixel is [11111111] and its scrambler state is [00000001], the scrambled data is [11111110]. The scrambler 442 scrambles data per pixel so that the same data is not successively given.

The encoder 443 encodes the scrambled data in accordance with a previously determined rule. There are no limits to the rule for the encoding, and for example an '8b10b' coding rule may be used. The encoder 443 uses a preset encoder state to encode the image data.

The serializer 444 serializes the encoded data in a time-axial direction.

Such a series of processes for converting the data is completed, the transmitter 440 transmits the image signal to the receiver 510 through the data lane.

The elements of the receiver 510 respectively correspond to those of the transmitter 440. The de-serializer 511 recovers the data serialized by the serializer 444, the decoder 512 decodes the data encoded by the encoder 443, the de-scrambler 513 descrambles the data scrambled by the scrambler 442, and the unpacker 514 unpacks the data packed by the packer 441.

That is, the decoder 512 shares the encoder state used for the encoding with the encoder 443, and thus uses this shared encoder state to decode the image data. Further, the de-scrambler 513 shares the scrambler state for the scrambling with the scrambler 442, and thus uses this shared scrambler state to descramble the image data.

Thus, the receiver 510 outputs the data of 36 bits, the sync signal, and the pixel clock.

As described above, the V×1 interface protocol does not separately transmit the clock signal while the image signal is transmitted between the transmitter 440 and receiver 510. Instead, the receiver 510 recovers the clock signal from the received image signal, and this process will be called a clock data recovery (CDR).

Separately from the data lane through which the image data is transmitted from the transmitter 440 to the receiver 510, a control signal line is formed for transmitting a control signal from the receiver 510 to the transmitter 440. Such a control signal includes a hot plug detect signal (HTPDN) and a CDR lock signal (LOCKN).

The HTPDN shows a connection state between the transmitter 440 and the receiver 510. For example the receiver 510 is not connected to the transmitter 440 or the receiver 510 is not activated, the HTPDN of the transmitter 440 has a high state. In this case, the transmitter 440 may enter a standby mode. If the receiver 510 is activated and connected to the transmitter 440, the HTPDN has a low state and the transmitter 440 transmits a CDR training pattern. The CDR training will be described later.

The HTPDN connection between the transmitter 440 and the receiver 510 may be omitted in accordance with options of an application. In this case, the HTPDN of the transmitter 440 has to maintain the low state.

The LOCKN indicates whether the CDR is locked or not. If the receiver 510 is not activated or is in a CDR training mode, the LOCKN at the input of the transmitter 440 is set to high by a pull-up resistor. When the CDR lock is done, the LOCKN is set to low by the receiver 510. Then, the CDR training mode finishes, and the transmitter 440 shifts to the normal mode.

FIG. 8 is a table illustrating an example number of lanes used corresponding to image data formats defined by a V×1 transmission interface protocol applied to the display apparatus according to the second example embodiment;

As illustrated in FIG. 8, the number of lanes needed for transmitting the image data in accordance with the V×1 transmission interface protocol is determined by the resolution and refresh rate of the image data.

For example, in case of FHD image data of 1080p, two lanes are needed for a refresh rate of 60 Hz, but sixteen lanes are needed for a refresh rate of 480 Hz. On the other hand, eight lanes are needed for UHD image data of 2160p even though the refresh rate is 60 Hz.

Like this, the number of lanes needed for transmitting the image data increases as the image data has higher resolution and higher refresh rate.

Figure 9:
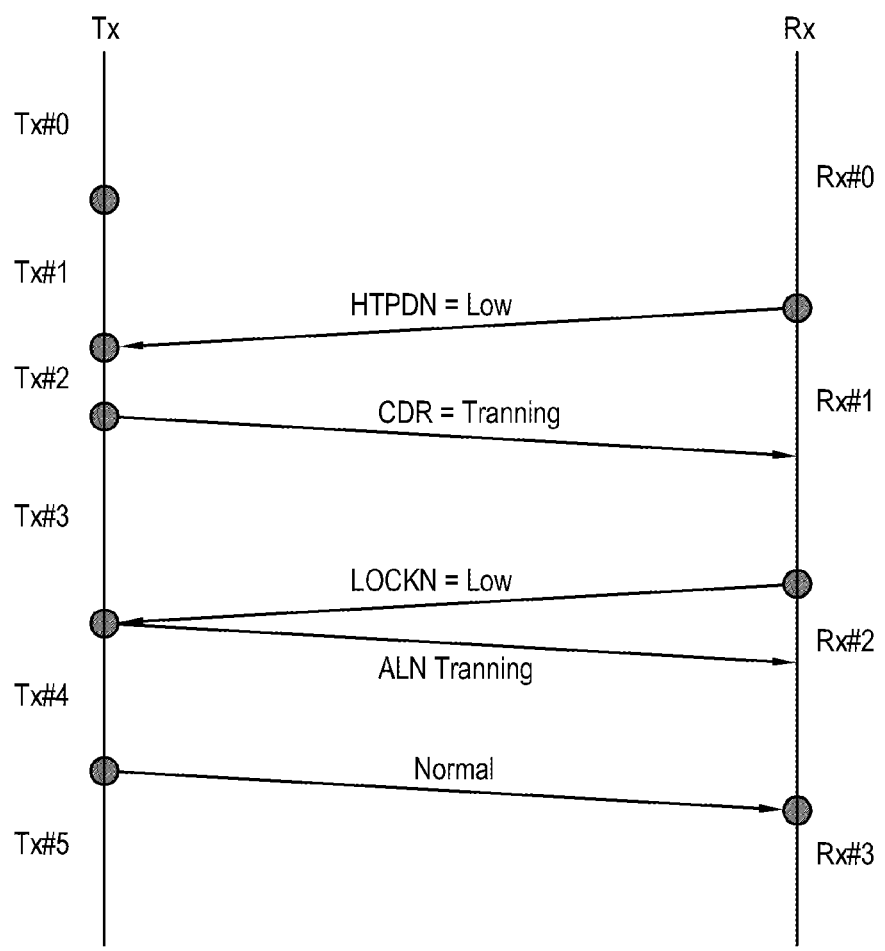
FIG. 9 is a diagram illustrating example signal flow of transmitting image data based on the V×1 transmission interface protocol applied to the display apparatus according to the second example embodiment.

FIG. 9 is a diagram illustrating example signal flow of transmitting image data complying with the V×1 transmission interface protocol applied to the display apparatus according to the second example embodiment.

As illustrated in FIG. 9, the transmitting terminal Tx first performs many preparation processes to transmit the image data to the receiving terminal Rx. 'Tx' refers to the transmitting terminal Tx, Rx refers to the receiving terminal Rx, and '# number' refers to the nth phase. For example, 'Tx#0' indicates the first phase of the transmitting terminal Tx.

The transmitting terminal Tx and the receiving terminal Rx are not connected to each other in their initial states. That is, 'Tx#0' and 'Rx#0' respectively indicate that the transmitting terminal Tx and the receiving terminal Rx are shut down. The transmitting terminal Tx enters the standby mode when the receiving terminal Rx is inactivated. Thus, 'Tx#1' refers to the standby mode.

If it is detected that the transmitting terminal Tx and the receiving terminal Rx are connected, the HTPDN of the transmitting terminal Tx becomes a low state. 'Tx#2' becomes an acquisition state, and the transmitting terminal Tx performs the CDR training by transmitting a preset toggle pattern for the CDR lock to the receiving terminal Rx. Thus, 'Tx#3' and 'Rx#1' show the CDR training mode. The CDR training is to check whether the receiving terminal Rx can normally receive a signal from the transmitting terminal Tx, i.e. check the reception of the receiving terminal Rx.

When the CDR training is done, the LOCKN of the transmitting terminal Tx becomes a low state. Thus, the transmitting terminal performs alignment (ALN) training to transmit a certain pattern for initializing data to the receiving terminal Rx. Thus, 'Tx#4' and 'Rx#2' show the ALN training mode. The ALN training is to learn a packaging pattern of a clock signal so that the receiving terminal Rx can recover the clock signal from the data signal when the transmitting terminal Tx transmits the data signal embedded with the clock signal based on the V×1 interface. That is, the receiving terminal Rx can recover the clock signal from the received image signal through the ALN training.

When the ALN training is done, the transmitting terminal Tx enters a normal mode and transmits an actual image signal to the receiving terminal Rx. Thus, 'Tx#5' and 'Rx#3' show the normal mode.

Through the foregoing preparation processes, the transmitting terminal Tx can transmit the image data based on the V×1 interface protocol to the receiving terminal Rx.

Figure 10:
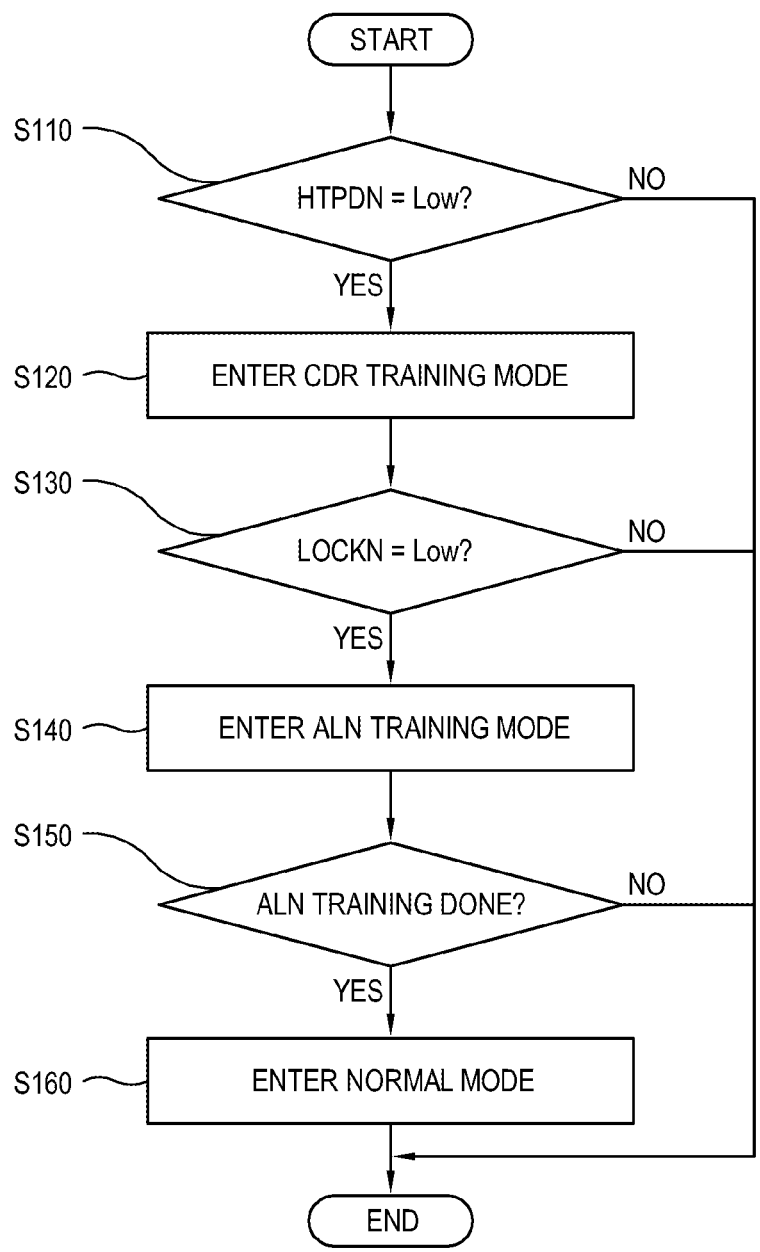
FIG. 10 is a flowchart illustrating an example in which the transmitting terminal transmits image data based on the V×1 transmission interface protocol in the display apparatus according to the second example embodiment.

FIG. 10 is a flowchart illustrating an example of the transmitting terminal transmitting image data based on the V×1 transmission interface protocol in the display apparatus according to the second example embodiment;

As illustrated in FIG. 10, at operation S110 the transmitting terminal of the display apparatus determines whether the HTPDN is in the low state.

If it is determined that the HTPDN is low, at operation S120 the transmitting terminal enters the CDR training mode and transmits a pattern signal for the CDR training to the receiving terminal.

At operation S130 the transmitting terminal determines the LOCKN is in the low state.

If it is determined that the LOCKN is in the low state, at operation S140 the transmitting terminal enters the ALN training mode and transmits a pattern signal for the ALN training to the receiving terminal.

At operation S150 the transmitting terminal determines whether the ALN training is done.

If it is determined that the ALN training is done, at operation S160 the transmitting terminal enters the normal mode and transmits the image signal to the receiving terminal.

With these processes, the transmitting terminal can transmit the image signal to the receiving terminal. By the way, the image signal transmitted from the transmitting terminal to the receiving terminal may fail to meet the standards of the preset image format by various causes as described above.

Referring back to FIG. 6, there may be some causes of the problem that the image signal transmitted from the transmitting terminal 400 to the receiving terminal 500 fails to meet the standards of the image format. For example, an error may occur while the image signal generator 430 generates an image signal based on data output from the decoder 420, an error may occur while the transmitter 440 converts an image signal in accordance with the V×1 interface, or an error may occur in any element of the transmitting terminal 400 prior to the stage of the image signal generator 430.

Conventionally, the image signal transmitted from the transmitting terminal to the receiving terminal has been processed as it is without undergoing any checking process. However, if the image signal received from the transmitting terminal fails to meet the standards of the image format, a finally displayed image has a problem with quality.

Below, an example embodiment for addressing such a problem will be described.

FIG. 11 is a block diagram illustrating an example in which the V×1 interface based signal is transmitted between a transmitting terminal 610 and a receiving terminal 620 of a display apparatus 600 according to a third example embodiment;

As illustrated in FIG. 11, the display apparatus 600 according to the third example embodiment has a structure that image data is transmitted between the transmitting terminal 610 and the receiving terminal 620. Here, the transmitting terminal 610 and the receiving terminal 620 are just named for convenience in connection with between transmitting and receiving the image data, and the transmitting terminal 610 and the receiving terminal 620 may have various structures within the structure of the display apparatus 600. For example, if the transmitting terminal 610 is the image processing board 110 (see FIG. 2), the receiving terminal 620 may be the timing control board 120 (see FIG. 2). If the transmitting terminal 610 is the timing control board 120 (see FIG. 2), the receiving terminal 620 may be the driver 130 (see FIG. 2). Alternatively, the transmitting terminal 610 and the receiving terminal 620 may be chips installed on the same board.

The display apparatus 600 includes the transmitting terminal 610, the receiving terminal 620 and the controller 630. The transmitting terminal 610 includes an input portion 611, a decoder 612, an image signal generator 613, and a transmitter 614. The receiving terminal 620 includes a receiver 621, an output portion 622, and an error sensor 623. Among them, the elements except the error sensor 623 and the controller 630 are equivalent to those of the embodiments described with reference to FIG. 6, and thus repetitive descriptions thereof will be avoided as necessary.

In this example embodiment, the controller 630 is not included in the transmitting terminal 610 and the receiving terminal 620. Alternatively, the controller and the transmitting terminal may be respectively installed on separate boards, or the controller and the transmitting terminal may be installed on one board.

The error sensor 623 senses whether an image format error occurs in an image signal received in the receiver 621. The image format error is also called the image format timing error. In case of the V×1 interface, the image format error is defined by the CEA-861 protocol.

The error sensor 623 senses whether the received image signal has an image format error, in response to a certain event at which the image format error is predicted to occur in the image signal transmitted from the transmitting terminal 610. When the image format error is sensed, the error sensor 623 informs the controller 630 of a result from sensing the image format error. How the error sensor 623 senses the image format error of the image signal will be described later.

Here, there are many cases of the certain event, at which the image format error is predicted to occur in the image signal. For example, a case where the image format error frequently occurs may be determined through experiments, and the error sensor 623 may be designed to sense the image format error based on this case.

For example, the event may refer to timing of when the resolution of the image signal is changed or timing of when the system is powered on/off. When this event happens, the error sensor 623 executes an algorithm for sensing the image format error. Alternatively, the error sensor 623 may periodically execute the algorithm for sensing the image format error regardless of the certain event.

The controller 630 receives a result that the image format error is sensed in the image signal received in the receiving terminal 620 from the error sensor 623 and controls the image format error to be recovered. There are some methods of correcting the image format error in the controller 630.

For example, the method of correcting the image format error includes a method of initializing the V×1 transmission protocol by resetting the transmitter 614, a method of resetting the image signal generator 613, a method of resetting the whole transmitting terminal 610, a method of stopping an input of an image signal to the transmitting terminal 610 for a preset period of time and resuming the input, a method of resetting a clock, etc. The controller 630 selectively uses one among these methods, and uses another method if the selected method is not effective.

If it is determined that the image format error is corrected, the controller 630 performs the processes as described above with reference to FIG. 9 and FIG. 10 so that an image signal can be transmitted from the transmitting terminal 610 to the receiving terminal 620.

With this structure, the display apparatus 600 corrects an image format error if the image format error occurs while transmitting the image signal based on the V×1 interface protocol, and thus guarantees quality of an image.

Below, the format of the image signal defined in the CEA-861 protocol will be described.

FIG. 12 is a table illustrating example standards of a preset image format applied to the display apparatus according to the third example embodiment;

As illustrated in FIG. 12, the display apparatus stores a list 710 in which normal format values are respectively designated corresponding to data formats of the image signal.

The image signal includes a data signal and a blanking timing signal, and the blanking timing signal includes a horizontal sync signal H-sync, a vertical sync signal V-sync, and a data enable signal DE.

In the list 710, format values of H-sync, V-sync and DE signals are designated with respect to the data signal having a predetermined horizontal resolution value and a predetermined vertical resolution value. In the list 710, 'm1', 'm2', 'n1', 'n2', 'k1', 'k2', 'k3', 'k4', 'k5' and 'k6' are constants.

For example, if the image data has a horizontal resolution value of 'm1' and a vertical resolution value of 'n1', the image format of the image data is normal when the image data has an H-sync value of 'k1', a V-sync of 'k2', and a DE value of 'k3'. On the other hand, if at least one among the five vales of 'm1', 'n1', 'k1', 'k2' and 'k3' of the image signal is different from that of the list 710, it is determined that this image signal has an image format error.

Similarly, if the image data has a horizontal resolution value of 'm2' and a vertical resolution value of 'n2', the image format of the image data is normal when the image data has an H-sync value of 'k4', a V-sync of 'k5', and a DE value of 'k6'. On the other hand, if at least one among the five vales of 'm2', 'n2', 'k4', 'k5' and 'k6' of the image signal is different from that of the list 710, it is determined that this image signal has an image format error.

Here, 'm1', 'm2', 'n1' and 'n2' are expressed in units of pixels since they are resolutions. Likewise, 'k1', 'k2', 'k3', 'k4', 'k5' and 'k6' are also expressed in units of pixels. However, 'k1', 'k2', 'k3', 'k4', 'k5' and 'k6' may be alternately designed to be expressed in units of clocks. The foregoing values comply with the rules of the CEA-861 protocols.

FIG. 13 is a flowchart illustrating an example of correcting an image format error that may occur when the display apparatus according to the third example embodiment transmits the image data through the V×1 transmission interface.

As illustrated in FIG. 13, at operation S210 the display apparatus transmits image data from the transmitting terminal to the receiving terminal.

At operation S220 the display apparatus determines whether a certain event, at which the image format error is predicted to occur, happens.

If it is determined that the certain event happens, at operation S230 the display apparatus checks the image format error with regard to each lane of transmitting the image data between the transmitting terminal and the receiving terminal.

At operation S240 the display apparatus determines whether at least one lane has the image format error.

If it is determined that at least one lane has the image format error, at operation S250 the display apparatus stops transmitting the image data and performs the image format recovery.

If the image format recovery is completed, at operation S260 the display apparatus resumes transmitting the image data.

On the other hand, if it is determined that all the lanes do not have the image format error, at operation S270 the display apparatus continues to transmitting the image data.

Below, a process of recovering the image format between the transmitting terminal and the receiving terminal will be described in more detail.

FIG. 14 and FIG. 15 are flowcharts illustrating a more detailed example of recovering an image format when a preset event happens in the receiving terminal of the display apparatus according to the third example embodiment. FIGS. 14 and 15 illustrate operations of determining whether the image format error occurs and recovers the image format in the state that the preset event happens.

As illustrated in FIG. 14 and FIG. 15, at operation S310 the display apparatus turns off the receiving terminal.

At operation S320 the display apparatus generates a jitter or noise in the transmitting terminal. The reason of generating such a jitter will be described later. Alternatively, the operations S320 may be omitted.

At operation S330 the display apparatus counts the number of lanes for transmitting an image signal.

At operation S340 the display apparatus delays a preset time, for example, 50 ms. At operation S350 the display apparatus turns on the receiving terminal. At operation S360 the display apparatus delays a preset time, for example, 50 ms again. The operations S340 and S360 are applied for stabilizing the signal.

At operation S370 the display apparatus checks the image format error of the image signal with regard to each lane. Details of an algorithm for checking the image format error will be described later.

At operation S380 the display apparatus registers a result of checking the image format error to a register. For example, the display apparatus registers a value of '0' if the image format error is detected in the image signal of at least one lane, and registers a value of '1' if the image format error is not detected in the image signals of all the lanes.

At operation S390 the display apparatus determines whether the value registered to the register is 1 or not.

If it is determined that the value registered to the register is '1', at operation S400 the display apparatus turns off the jitter applied to the transmitting terminal. If the foregoing operation S320 is not performed, the operation S400 is also not performed. At operation S410 the display apparatus resumes the output from the receiving terminal and the transmission of the image signal.

On the other hand, if it is determined that the value registered to the register is '0', at operation S420 the display apparatus recovers the image format, for example, resets the transmitting terminal.

At operation S430 the display apparatus performs the CDR training in order to resume transmitting the image signal after resetting the transmitting terminal.

At operation S440 the display apparatus locks the receiving terminal after the CDR training.

At operation S450 the display apparatus performs the ALN training. When the ALN training is done, the display apparatus returns to the operation S350.

Then, the display apparatus returns to the operation S370, and checks again whether the image format error occurs after recovering the image format.

With this process, the display apparatus detects and corrects the image format error of the image signal transmitted based on the V×1 interface protocol.

By the way, the reason why the jitter is generated in the transmitting terminal at the foregoing operation S320 will be described. The display apparatus forcibly generates the jitter with regard to clocks for driving the transmitting terminal in order to enhance an efficiency of sensing an error in the operation S370 of checking the image format error. Various numerical values may be applied to the generated jitter. For example, spread spectrum control (SSC) may make the jitter be deviated by 4.5% with respect to a time axis and applied to the transmitting terminal.

The generated jitter makes it easy to cause errors which occur under only a certain condition like a case where there is change in temperature at high temperature or low temperature, and therefore the image format error likely to occur, thereby improving reliability in the process of checking the image format error. That is, the jitter is forcibly applied to the clock signal for driving the transmitting terminal, thereby satisfying requirements where a timing error easily occurs. Accordingly, the image signal output from the transmitting terminal is reset and output as a signal strong on external environmental change and noise.

Below, a method of checking the image format error of the image signal with respect to each lane will be described in detail.

For example, a total of eight lanes from lane No. 0 to lane No. 7 are needed to transmit an image signal having a resolution of 3840×2160 based on the V×1 interface protocol. Each lane is used to transmit an image single having a resolution of 480×2160, and eight image signals each having the resolution of 480×2160 are simultaneously transmitted through eight lanes. In the receiving terminal, eight image signals simultaneously transmitted through eight lanes are combined and recovered into the image signal having the resolution of 3840×2160. By the way, while the image signals are transmitted through eight lanes, an image signal corresponding to one lane may have an error and image signals corresponding to the other seven lanes may have no errors. Further, image signals corresponding to two lanes may have errors, and image signals corresponding to the other six lanes may have no errors. In addition, image signals corresponding to all eight lanes may have errors.

Below, a method of determining an image format error of each lane in the display apparatus will be described.

FIG. 16 to FIG. 19 are diagrams illustrating an example principle of generating a test signal to determine the image format error with regard to each lane in the display apparatus according to the third example embodiment.

Figure 16:
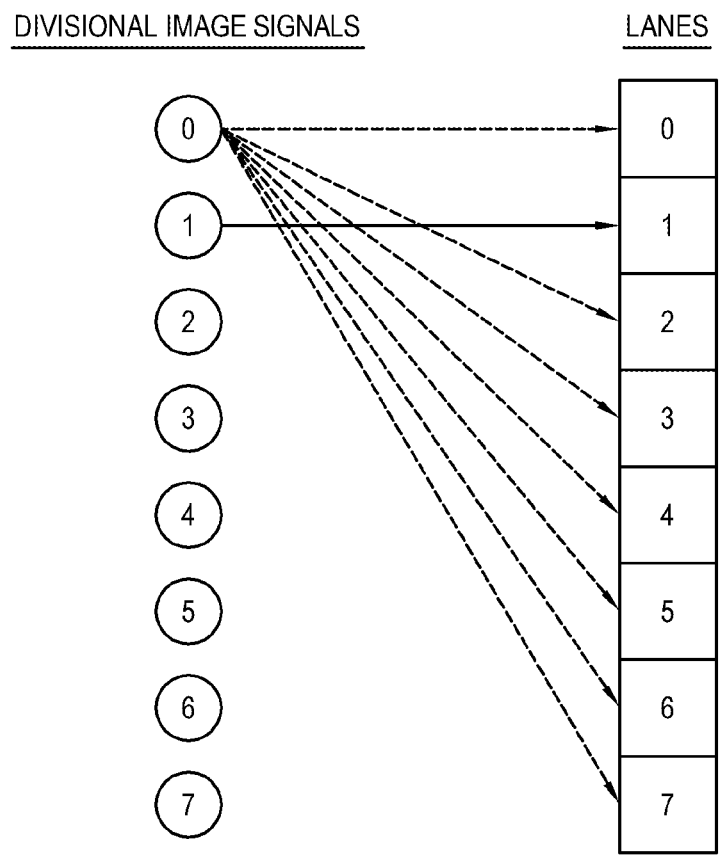

As illustrated in FIG. 16, suppose that the display apparatus transmits an image signal having a resolution of 3840×2160 through eight lanes. The image signal having the resolution of 3840×2160 is divided into eight divisional image signals each having a resolution of 480×2160 corresponding to each lane. When the image signal is normally transmitted, the display apparatus combines and recovers the divisional image signals from the respective lanes into the image signal having the original resolution. Further, the display apparatus generates clock and sync signals by extracting a blanking timing signal from the divisional image signal received through a reference lane No. 0 among the eight lanes.

In the algorithm for checking the image format error, the display apparatus makes a divisional image signal corresponding to one among the lanes from the lane Nos. 1 to 7 be received in the receiving terminal through the corresponding lane, copies the divisional image signal corresponding to the reference lane No. 0, and makes the copied divisional image signal be received in the receiving terminal through the other lanes. Then, the display apparatus recovers the image signal by synthesizing all the divisional image signals received in the receiving terminal, and determines whether the standards of the image format of the recovered image signal meets the preset standards, thereby determining whether the image format error occurs. This process will be repeated as many as preset times.

Here, the standards of the image format of the recovered image signal include standards of a data signal format including a horizontal resolution and a vertical resolution, and standards of a blanking timing signal format including a horizontal sync signal, a vertical sync signal and a DE signal.

For example, the display apparatus first transmits the divisional image signal generated corresponding to the lane No. 1 from the transmitting terminal to the receiving terminal through the lane No. 1, and transmits the divisional image signal generated corresponding to the lane No. 0 from the transmitting terminal to the receiving terminal through the other seven lanes. Next, the display apparatus synthesizes eight divisional image signals received in the receiving terminal and thus recovers the original image signal.

The display apparatus determines whether a value of at least one parameter among a horizontal resolution, a vertical resolution, a horizontal sync signal, a vertical sync signal and a DE signal of the recovered image signal is equal to that of the preset standards. As described above, the value of the parameter may be given as the number of clocks or the number of pixels.

If it is determined that the format of the image signal in the current operation is not equal to that of the preset standards, the display apparatus determines that the image format error occurs, and returns to the operation of recovering the image format. On the other hand, if it is determined that the format of the image signal is equal to that of the preset standards, the display apparatus executes the algorithm for checking the image format error with respect to the next lane.

Figure 17:
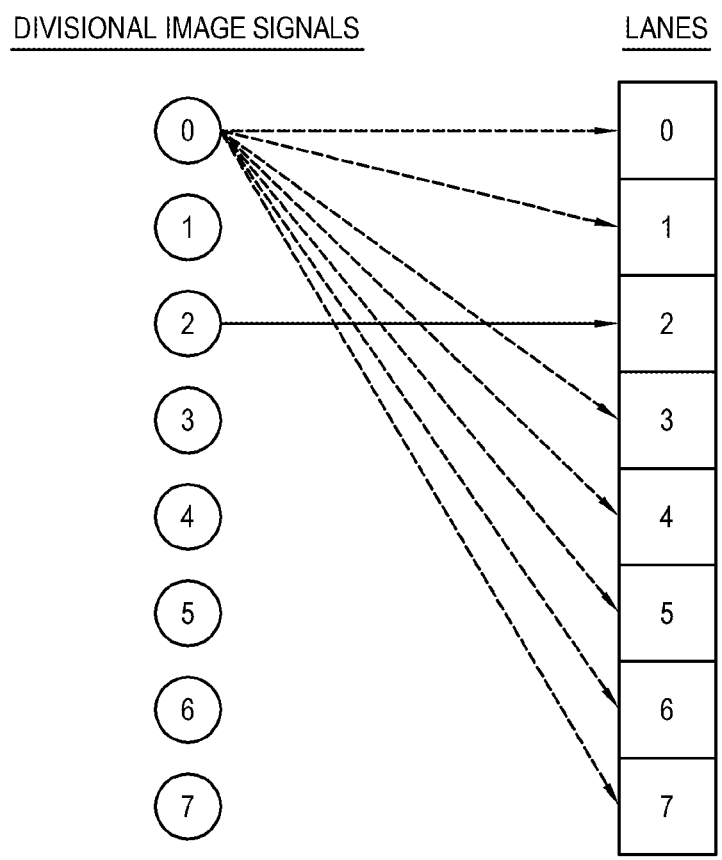

As illustrated in FIG. 17, the display apparatus transmits a divisional image signal generated corresponding to the lane No. 2 from the transmitting terminal to the receiving terminal through the lane No. 2, and transmits the divisional image signal generated corresponding to the lane No. 0 from the transmitting terminal to the receiving terminal through the other seven lanes. Next, the display apparatus synthesizes eight divisional image signals received in the receiving terminal and thus recovers the original image signal.

The display apparatus determines whether a value of at least one parameter among a horizontal resolution, a vertical resolution, a horizontal sync signal, a vertical sync signal and a DE signal of the recovered image signal is equal to that of the preset standards.

If it is determined that the format of the image signal in the current operation is not equal to that of the preset standards, the display apparatus determines that the image format error occurs, and returns to the operation of recovering the image format. On the other hand, if it is determined that the format of the image signal is equal to that of the preset standards, the display apparatus executes the algorithm for checking the image format error with respect to the next lane. In this manner, the error checking process is performed up to the lane No. 7.

Like this, if the error checking process is implemented with regard to the lanes from the lane No. 1 to the lane No. 7, the data signal format is checked with respect to each lane. However, this process falls short of checking an error with respect to the blanking timing signal format included in the divisional image signal of each lane since the blanking timing signal is extracted from only the reference lane No. 0. Thus, the following process may be added to the foregoing error checking process.

Figure 18:
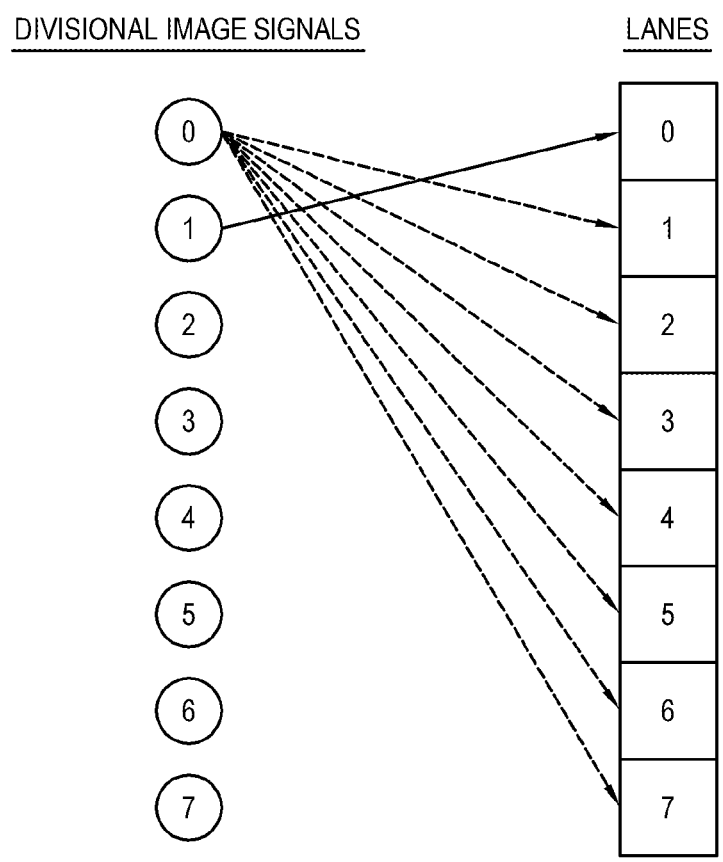

As illustrated in FIG. 18, the display apparatus first transmits the divisional image signal generated corresponding to the lane No. 1 from the transmitting terminal to the receiving terminal through the lane No. 0, and then transmits the divisional image signal generated corresponding to the lane No. 0 from the transmitting terminal to the receiving terminal through the other seven lanes. Next, the display apparatus synthesizes eight divisional image signals received in the receiving terminal and thus recovers the original image signal.

In this case, the blanking timing signal is extracted from the divisional image signal generated corresponding to the lane No. 1 since the divisional image signal generated corresponding to the lane No. 1 is received in the receiving terminal through the lane No. 0.

The display apparatus determines whether a value of at least one parameter among a horizontal resolution, a vertical resolution, a horizontal sync signal, a vertical sync signal and a DE signal of the recovered image signal is equal to that of the preset standards.

If it is determined that the format of the image signal in the current operation is not equal to that of the preset standards, the display apparatus determines that the image format error occurs, and returns to the operation of recovering the image format. On the other hand, if it is determined that the format of the image signal is equal to that of the preset standards, the display apparatus executes the algorithm for checking the image format error with respect to the next lane.

Figure 19:
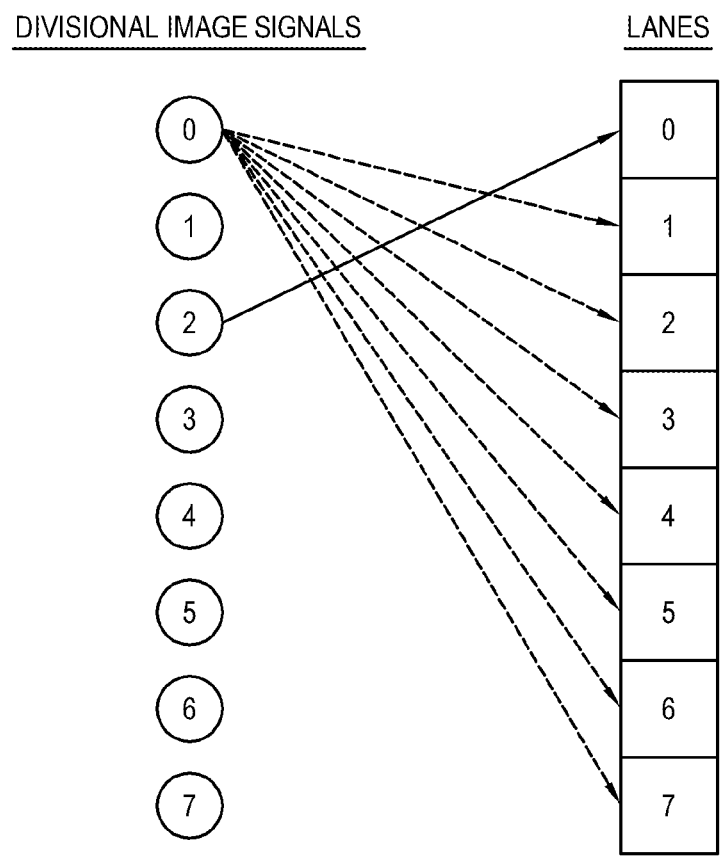

As illustrated in FIG. 19, the display apparatus transmits the divisional image signal generated corresponding to the lane No. 2 from the transmitting terminal to the receiving terminal through the lane No. 0, and transmits the divisional image signal generated corresponding to the lane No. 0 from the transmitting terminal to the receiving terminal through the other seven lanes. Next, the display apparatus synthesizes eight divisional image signals received in the receiving terminal and thus recovers the original image signal.

In this case, the blanking timing signal is extracted from the divisional image signal generated corresponding to the lane No. 2 since the divisional image signal generated corresponding to the lane No. 2 is received in the receiving terminal through the lane No. 0.

The display apparatus determines whether a value of at least one parameter among a horizontal resolution, a vertical resolution, a horizontal sync signal, a vertical sync signal and a DE signal of the recovered image signal is equal to that of the preset standards. As described above, the value of the parameter may be given as the number of clocks or the number of pixels.

If it is determined that the format of the image signal in the current operation is not equal to that of the preset standards, the display apparatus determines that the image format error occurs, and returns to the operation of recovering the image format. On the other hand, if it is determined that the format of the image signal is equal to that of the preset standards, the display apparatus executes the algorithm for checking the image format error with respect to the next lane. In this manner, the error checking process is performed up to the lane No. 7.

In the foregoing processes, the blanking timing signals are respectively extracted from the divisional image signal corresponding to the lane No. 1 to the divisional image signal corresponding to the lane No. 7, and it is thus possible to check the error with regard to the blanking timing signal format included in the divisional image signal corresponding to each lane.

The foregoing processes of checking the image format of the divisional image signal corresponding to each lane can be illustrated as follows.

FIG. 20 is a diagram illustrating example forms of a test signal in respective stages of a process for determining the image format error in the display apparatus according to the third example embodiment.

As illustrated in FIG. 20, when the image format checking begins with respect to eight lanes, the display apparatus transmits a test signal of [01000000] from the transmitting terminal to the receiving terminal, and determines the image format error of the image signal recovered in the receiving terminal. The test signal of [01000000] makes the divisional image signal generated corresponding to the lane No. 1 be transmitted from the transmitting terminal to the receiving terminal through the lane No. 1, and copies the divisional image signal generated corresponding to the lane No. 0 to be transmitted from the transmitting terminal to the receiving terminal through the other seven lanes.

Next, the display apparatus determines the image format error based on the test signals from [02000000] to [07000000].

Next, the display apparatus determines the image format error based on the test signals from [10000000] to [70000000]. The test signal of [70000000] makes the divisional image signal generated corresponding to the lane No. 7 be transmitted from the transmitting terminal to the receiving terminal through the lane No. 0, and copies the divisional image signal generated corresponding to the lane No. 0 to be transmitted from the transmitting terminal to the receiving terminal through the other seven lanes.

Like this, the error checking process is performed through a total of fourteen operations, and each operation may be repeated as many as preset times to improve reliability. If it is determined that the image format error does not occur until the process is fully finished, the display apparatus records a value of '1' in the register and maintains normal transmission of the image signal.

On the other hand, if it is determined that the image format error occurs in one operation among the fourteen operations 14, the display apparatus stops moving on to the nest operations and records a value of '0' in the register. Then, the display apparatus starts recovering the image format.

In addition, a method of determining the image format error with respect to the image signal recovered in the receiving terminal will be described in more detail. For example, suppose that the CEA-861 protocol defines a horizontal sync signal as three pixels and a vertical sync signal as nineteen pixels with regard to an image signal a resolution of 3840×2160.

If the divisional image signals having a format of [01000000] simultaneously transmitted through eight lanes are received and recovered in the receiving terminal, the recovered image signal has to have a horizontal resolution of 3840 pixels, a vertical resolution of 2160 pixels, a horizontal sync signal of 3 pixels, a vertical sync signal of 19 pixels so as to be determined as the normal image format. By the way, if the image format error occurs in the divisional image signal corresponding to a certain lane, the horizontal resolution may be not 3840 pixels but 3842 pixels or the vertical sync signal may be not 19 pixels but 17 pixels. Thus, if a value of at least one among the image formats of the divisional image signal is different from that of the standards, it is determined that the image format error occurs in the image signal.

FIG. 21 is a table illustrating an example list 810, where methods of recovering an image format are listed according to priorities, to be referred to by a display apparatus according to a fourth example embodiment;

As illustrated in FIG. 21, there are many methods of recovering the image format in accordance with the image format error, and the display apparatus may selectively use one of them.

For example, the method of recovering the image format includes a method of initializing the V×1 transmission protocol by resetting the transmitter of the transmitting terminal, a method of resetting the image signal generator in the transmitting terminal, a method of resetting the whole board including the transmitting terminal, a method of stopping receiving input of an image signal to the transmitting terminal for a predetermined period of time and resuming the input, and a method of resetting clocks.

The display apparatus may refer to the list 810 of prioritizing the methods in order to recover the image format. If an image format error is detected again while checking the image format error after recovering the image format by one among the methods, the display apparatus selects another method in the list 810 to recover the image format.

In the list 810 illustrated in FIG. 21, the first priority in the methods is to reset the transmitter, the second priority is to reset the image signal generator, the third priority is to stop receiving the input of the image signal and resume receiving the input, the fourth priority is to reset the clocks, and the fifth priority is to reset the whole board. Here, the methods listed according to the priorities are nothing but an example of the list 810. Alternatively, the list 810 may be variously designed.

The priorities may be given according to various factors. For example, the element where the most image format errors occur may be preferentially taken into account. If the most image format errors occur while the transmitter converts an image signal to be transmittable based on the V×1 interface, the method of resetting the transmitter may be highly prioritized in the list 810.

Alternatively, a method, which requires relatively less system load or rakes relatively less time when it is implemented, may be preferentially considered. The method of resetting the whole board or the like large element requires more system load or longer time than the method of resetting the transmitter, the image signal generator or the like small element. Therefore, the method of resetting the whole board may be pushed back on the priority list 810.

The priorities respectively set to the recovering methods in the list 810 by taking such factors into account are just given by way of example, which should be not construed as limiting the present disclosure.

FIG. 22 is a flowchart illustrating an example of recovering the image format in the display apparatus according to the fourth example embodiment.

As illustrated in FIG. 22, at operation S510 the display apparatus senses a preset event where it is expected that an image format error occurs.

At operation S520 the display apparatus checks the image format error in accordance with preset algorithms, and thus determines whether the image format error occurs.

If it is determined that the image format error occurs, at operation S530 the display apparatus calls for the list where the methods of recovering the image format are prioritized.

At operation S540 the display apparatus selects the recovering method having the highest priority in the list.

At operation S550 the display apparatus recovers the image format in accordance with the selected method.

At operation S560 the display apparatus checks the image format error again and determines whether the image format error occurs.

If the image format error still occurs, at operation S570 the display apparatus selects the recovering method having the next highest priority in the list, and returns to the operation S550.

If it is determined in the operations S520 and S560 that the image format error does not occur, at operation S580 the display apparatus keeps transmitting the image signal.

Like this, the display apparatus may take various factors into account if a plurality of recovering methods is prepared, and thus selectively use each method.

In the foregoing example embodiments, the present disclosure is applied to internal transmission of the display apparatus. However, the transmission of the image signal is not limited to the foregoing example embodiments, but applicable to more various cases.

FIG. 23 is a block diagram illustrating an example image processing apparatus 900 according to a fifth example embodiment.

As illustrated in FIG. 23, the image processing apparatus 900 according to the fifth example embodiment includes a transmitting terminal 910 for processing an image signal, a receiving terminal 920 for receiving and processing the image signal from the transmitting terminal 910 to be output to an external display apparatus 1000, and a controller 930 for sensing and correcting an image format error of the image signal received in the receiving terminal 920. Since the image processing apparatus 900 itself does not have a display panel (not shown) for displaying an image, the receiving terminal 920 is provided to output the image signal to the display apparatus 1000.

The transmitting terminal 910 and the receiving terminal 920 may be respectively achieved by different image processing boards. Alternatively, the transmitting terminal 910 and the receiving terminal 920 may be distinguished from each other within one image processing board. The transmitting terminal 910 transmits an image signal to the receiving terminal 920 in accordance with the V×1 or the like preset transmission interface protocol. Thus, the controller 930 senses whether the image signal received in the receiving terminal 920 has the image format error, and corrects the image format error if the image format error is sensed. In light of sensing and correcting the image format error, the structures and functions of transmitting terminal 910, the receiving terminal 920 and the controller 930 are equivalent to those of the foregoing example embodiments, and thus repetitive descriptions thereof will be avoided as necessary.

Thus, it is possible to transmit an image signal, which has a normal image format recovered from an image format error, from the image processing apparatus 900 to the display apparatus 1000.

FIG. 24 is a block diagram illustrating an example image processing apparatus 1100 and a display apparatus 1200 according to a sixth example embodiment.

As illustrated in FIG. 24, the image processing apparatus 1100 according to the sixth example embodiment includes a transmitting terminal 1110 for processing an image signal, and a controller 1120 for recovering an image format in response to an error sensing signal received from the display apparatus 1200. Further, the display apparatus 1200 includes a receiving terminal 1210 for receiving the image signal from the transmitting terminal 1110 and processing it to be displayed as an image, and an error sensor 1220 for sensing an image format error of the image signal received in the receiving terminal 1210 and informing the image processing apparatus 1100 of the image format error.

In this example embodiment, the image processing apparatus 1100 includes the transmitting terminal 1110, and the display apparatus 1200 has the receiving terminal 1210. That is, the image signal is transmitted from the image processing apparatus 1100 to the display apparatus 1200 in accordance with the V×1 transmission interface protocol.

If an image format error is sensed in the image signal received in the receiving terminal 1210, the error sensor 1220 transmits an error sensing signal based on the sensing results to the controller 1120. In response to the error sensing signal from the error sensor 1220, the controller 1120 controls the transmitting terminal 1110 to recover the image format of the image signal.

In light of sensing and correcting the image format error, the structures and functions of the transmitting terminal 1110, the receiving terminal 1210, the error sensor 1220 and the controller 1120 are equivalent to those of the foregoing example embodiments, and thus repetitive descriptions thereof will be avoided as necessary.

Thus, it is possible to output an image signal, which has a normal format recovered from an image format error, from the image processing apparatus 1100 to the display apparatus 1200.

In the foregoing example embodiments, the present disclosure complies with the V×1 interface transmitting protocol, but not limited thereto. Alternatively, the present disclosure may comply with other interface transmitting protocols than the V×1 interface.

The methods according to the foregoing example embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the example embodiments. The program command recorded in this storage medium may be specially designed and configured according to the example embodiments, or may be publicly known and available to those skilled in the art of computer software.

Although a few example embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. A image processing apparatus comprising:
a transmitting terminal configured to transmit an image signal embedded with a clock signal;
a receiving terminal configured to receive the image signal from the transmitting terminal and to recover the clock signal from the received image signal;
at least one processor configured to:
apply jitter to the image signal transmitted from the transmitting terminal to the receiving terminal, wherein the image signal applied with the jitter is deviated in a time axis;
compare the image signal applied with the jitter and received in the receiving terminal with a reference signal of a predetermined timing standard based on a horizontal resolution value, a vertical resolution value, a horizontal sync signal value, a vertical sync signal value, and a data enable signal value;
in response to at least one among the values of the image signal applied with the jitter being different from at least one corresponding value of the reference signal, identify that an image format error is in the received image signal; and
control the transmitting terminal to recover the image signal, when it is identified that the image format error occurs.

2. The image processing apparatus according to claim 1, further comprising a sensor configured to sense whether the image format error occurs in the image signal,
wherein
the image processing apparatus is configured to transmit the image signal through a plurality of lanes between the transmitting terminal and the receiving terminal, and
the sensor is configured to sense the image format error based on a first error determination signal transmitted through a first lane among the plurality of lanes, and a second error determination signal generated by copying the first error determination signal and transmitted through a second lane different from the first lane.

3. The image processing apparatus according to claim 2, wherein the sensor is configured to recover the image signal by synthesizing a third error determination signal, different from the first error determination signal and transmitted through a third lane different from the first and second lanes, with the first and second error determination signals, and to sense the image format error by determining whether the image format of the recovered image signal comprises a preset standard.

4. The image processing apparatus according to claim 3, wherein the image processing apparatus is configured to obtain the first error determination signal, the second error determination signal and the third error determination signal by dividing the image signal into signals respectively corresponding to the plurality of lanes.

5. The image processing apparatus according to claim 1, wherein the transmitting terminal comprises:
a transmitter configured to convert the image signal to be transmittable to the receiving terminal in accordance with a preset transmission interface protocol; and
an image signal generator configured to generate and provide the image signal to the transmitter, and
the at least one processor is configured to recover the image signal from the image format error by resetting at least one of the transmitter and the image signal generator.

6. The image processing apparatus according to claim 1, wherein the at least one processor is configured to recover the image signal from the image format error by resetting the whole transmitting terminal.

7. The image processing apparatus according to claim 1, further comprising a sensor configured to sense whether the image format error occurs in the image signal,
wherein the at least one processor is configured to activate the sensor to sense the image format error in response to a preset event, and to determine that the preset event has occurred if the image signal received in the receiving terminal is changed in resolution.

8. The image processing apparatus according to claim 1, wherein the transmitting terminal and the receiving terminal are configured to be connected to each other so that the image signal can be transmitted through a transmission interface of V-by-One (V×1) interface.

9. A method of controlling an image processing apparatus, the method comprising:
applying jitter to an image signal transmitted from a transmitting terminal, which transmits the image signal embedded with a clock signal, to a receiving terminal which receives the image signal from the transmitting terminal and recovers the clock signal from the received image signal, wherein the image signal applied with the jitter is deviated in a time axis;
comparing the image signal applied with the jitter and received in the receiving terminal with a reference vertical resolution value, a horizontal sync signal value, a vertical sync signal value, and a data enable signal value;
in response to at least one among the values of the image signal applied with the jitter being different from at least one corresponding value of the reference signal, identifying that an image format error occurs in the received image signal; and
controlling the transmitting terminal to recover the image signal when it is identified that the image format error occurred.

10. The method according to claim 9, wherein
the image signal is transmitted through a plurality of lanes between the transmitting terminal and the receiving terminal, and
the identifying whether the image format error occurs in the image signal comprises sensing the image format error based on a first error determination signal transmitted through a first lane among the plurality of lanes, and a second error determination signal generated by copying the first error determination signal and transmitted through a second lane different from the first lane.

11. The method according to claim 10, wherein the sensing the image format error comprises:
recovering the image signal by synthesizing a third error determination signal, different from the first error determination signal and transmitted through a third lane different from the first and second lanes, with the first and second error determination signals; and
sensing the image format error by determining whether the image format of the recovered image signal comprises a preset standard.

12. The method according to claim 11, wherein the first error determination signal, the second error determination signal and the third error determination signal are obtained by dividing the image signal into signals respectively corresponding to the plurality of lanes.

13. The method according to claim 9, wherein the transmitting terminal comprises:
a transmitter configured to convert the image signal to be transmittable to the receiving terminal in accordance with a preset transmission interface protocol; and
an image signal generator configured to generate and provide the image signal to the transmitter, and
the controlling the transmitting terminal to recover the image signal comprises recovering the image signal from the image format error by resetting at least one of the transmitter and the image signal generator.

14. The method according to claim 9, wherein the controlling the transmitting terminal to recover the image signal comprises recovering the image signal from the image format error by resetting the whole transmitting terminal.

15. The method according to claim 9, wherein the identifying whether the image format error occurs in the image signal is performed in response to a preset event, and
the preset event occurs if the image signal received in the receiving terminal is changed in resolution.

16. The method according to claim 9, wherein the transmitting terminal and the receiving terminal are configured to be connected to each other so that the image signal can be transmitted through a transmission interface of V-by-One (V×1) interface.

* * * * *